United States Patent [19]
Gooding et al.

[11] 3,987,291
[45] Oct. 19, 1976

[54] PARALLEL DIGITAL ARITHMETIC DEVICE HAVING A VARIABLE NUMBER OF INDEPENDENT ARITHMETIC ZONES OF VARIABLE WIDTH AND LOCATION

[75] Inventors: David N. Gooding, Endicott; Everett M. Shimp, Endwell, both of N.Y.

[73] Assignee: International Business Machines Corporation, Armonk, N.Y.

[22] Filed: May 1, 1975

[21] Appl. No.: 573,656

[52] U.S. Cl. ............................................. 235/175
[51] Int. Cl.[2] ........................................... G06F 7/50
[58] Field of Search ................... 235/175, 174, 173

[56] References Cited
UNITED STATES PATENTS
3,188,453  6/1965  Schneider ........................... 235/175
3,683,163  8/1972  Hanslip .............................. 235/175

OTHER PUBLICATIONS
J. L. Rosenfeld, "Variable – Width Adder for Micro-programed Computers Used for Emulation," IBM Tech. Disclosure Bulletin, vol. 15, No. 4, Sept. 1972 pp. 1149–1150.

*Primary Examiner*—David H. Malzahn
*Attorney, Agent, or Firm*—Richard E. Bee

[57] ABSTRACT

A carry look-ahead parallel digital adder having a relatively wide overall data flow width and a pair of automatically adjustable boundary mechanisms for subdividing the adder into plural independent operating zones of variable width and variable location. Anywhere from one to three independent zones may be obtained. Independent external carry-in and carry-out lines are provided for each zone and the connecting points for such lines are automatically shifted in step with the movement of the zone boundaries.

27 Claims, 51 Drawing Figures

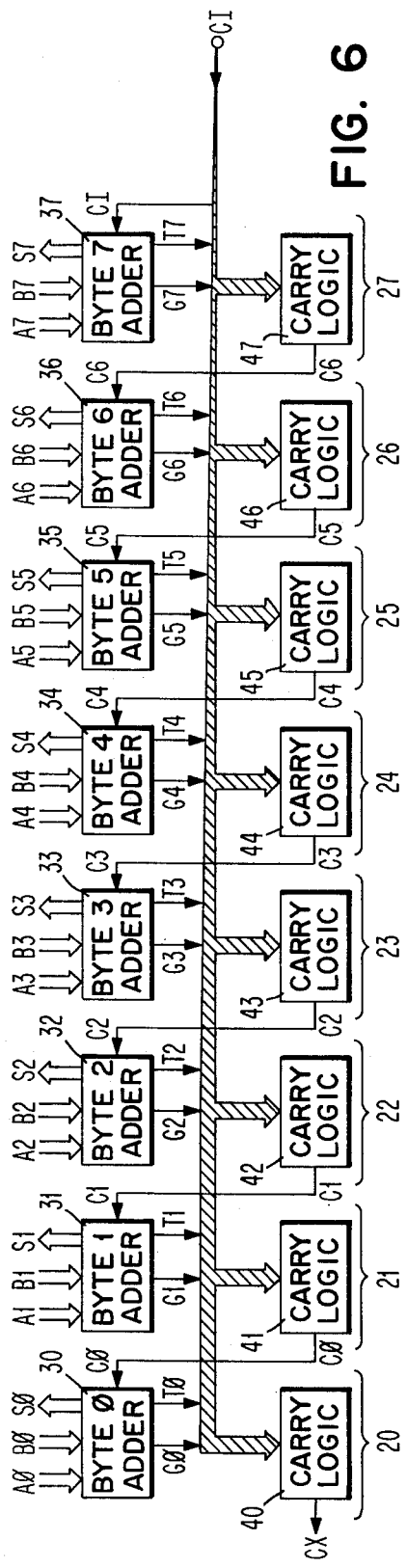

| CARRY | BYTE CARRY LOGIC (NON GROUPED) |
|---|---|
| | DESCRIPTION |
| CI | CI |
| C6 | $G7 + (T7)CI$ |
| C5 | $G6 + (T6)G7 + (T6 \cdot T7)CI$ |
| C4 | $G5 + (T5)G6 + (T5 \cdot T6)G7 + (T5 \cdot T6 \cdot T7)CI$ |
| C3 | $G4 + (T4)G5 + (T3 \cdot T4)G6 + (T4 \cdot T5 \cdot T6)G7 + (T4 \cdot T5 \cdot T6 \cdot T7)CI$ |
| C2 | $G3 + (T3)G4 + (T2 \cdot T3)G5 + (T3 \cdot T4 \cdot T5)G6 + (T3 \cdot T4 \cdot T5 \cdot T6)G7 + (T3 \cdot T4 \cdot T5 \cdot T6 \cdot T7)CI$ |
| C1 | $G2 + (T2)G3 + (T1 \cdot T2)G4 + (T2 \cdot T3 \cdot T4)G5 + (T2 \cdot T3 \cdot T4 \cdot T5)G6 + (T2 \cdot T3 \cdot T4 \cdot T5 \cdot T6)G7 + (T2 \cdot T3 \cdot T4 \cdot T5 \cdot T6 \cdot T7)CI$ |
| C0 | $G1 + (T1)G2 + (T1 \cdot T2)G3 + (T1 \cdot T2 \cdot T3)G4 + (T1 \cdot T2 \cdot T3 \cdot T4)G5 + (T1 \cdot T2 \cdot T3 \cdot T4 \cdot T5)G6 + (T1 \cdot T2 \cdot T3 \cdot T4 \cdot T5 \cdot T6)G7 + (T1 \cdot T2 \cdot T3 \cdot T4 \cdot T5 \cdot T6 \cdot T7)CI$ |
| CX | $G0 + (T0)G1 + (T0 \cdot T1)G2 + (T0 \cdot T1 \cdot T2)G3 + (T0 \cdot T1 \cdot T2 \cdot T3)G4 + (T0 \cdot T1 \cdot T2 \cdot T3 \cdot T4)G5 + (T0 \cdot T1 \cdot T2 \cdot T3 \cdot T4 \cdot T5)G6 + (T0 \cdot T1 \cdot T2 \cdot T3 \cdot T4 \cdot T5 \cdot T6)G7 + (T0 \cdot T1 \cdot T2 \cdot T3 \cdot T4 \cdot T5 \cdot T6 \cdot T7)CI$ |

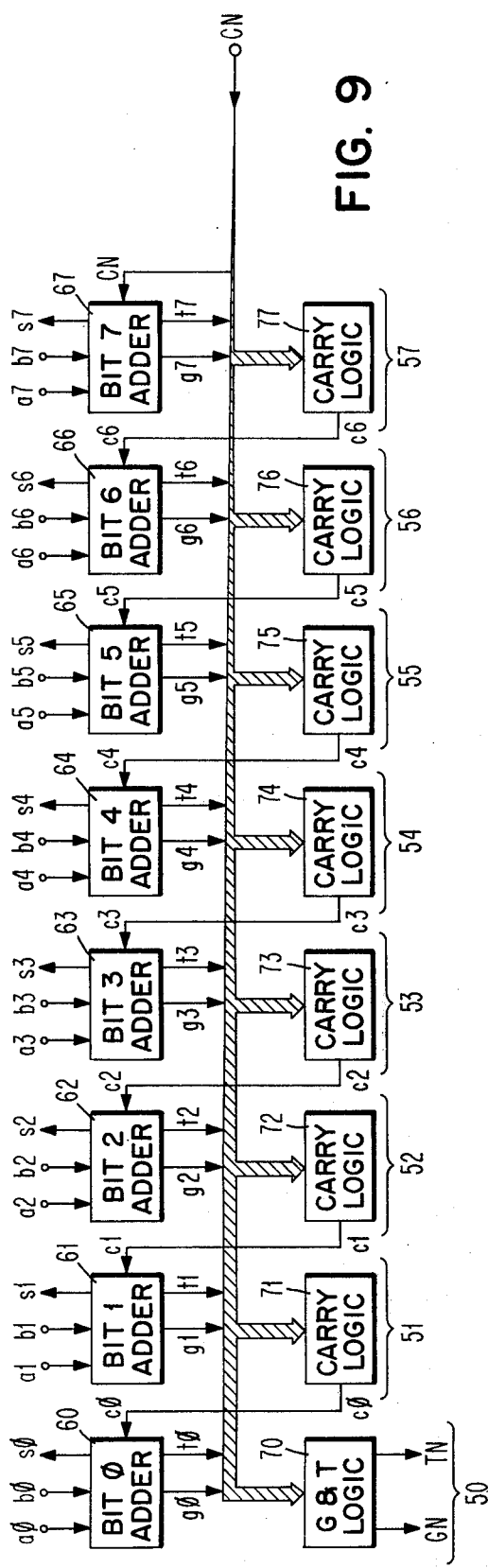

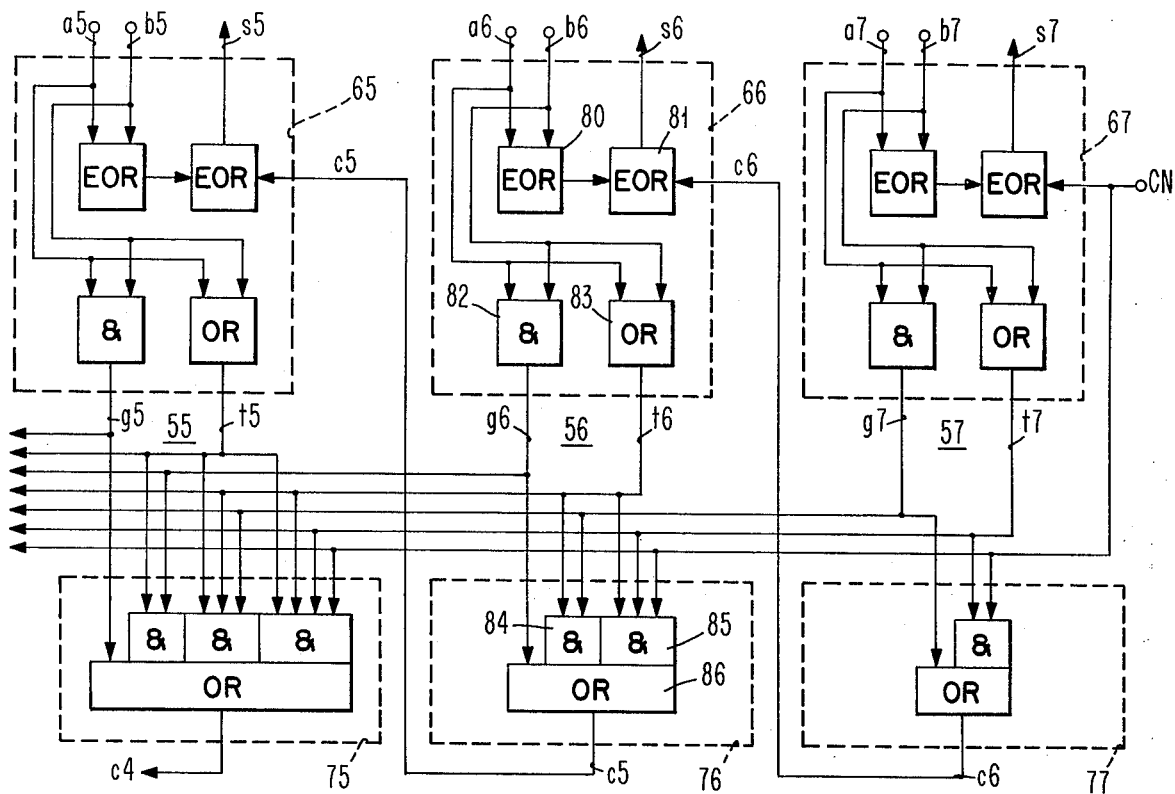

FIG. 10

| BIT CARRY LOGIC (GROUPED) ||
|---|---|
| ITEM | DESCRIPTION |
| c6 | g7+(t7)CN |
| c5 | g6+(t6)g7+(t6·t7)CN |
| g57 | g5+(t5)g6+(t5·t6)g7 |
| t57 | t5·t6·t7 |
| c4 | g57+(t57)CN |
| c3 | g4+(t4)g57+(t4·t57)CN |
| c2 | g3+(t3)g4+(t3·t4)g57+(t3·t4·t57)CN |
| g24 | g2+(t2)g3+(t2·t3)g4 |
| t24 | t2·t3·t4 |
| c1 | g24+(t24)g57+(t24·t57)CN |
| c0 | g1+(t1)g24+(t1·t24)g57+(t1·t24·t57)CN |
| GN | g0+(t0)g1+(t0·t1)g24+(t0·t1·t24)g57 |
| TN | t0·t1·t24·t57 |
| KN | GN+(TN)CN |

FIG. 12

| BYTE CARRY LOGIC (GROUPED) ||
|---|---|
| ITEM | DESCRIPTION |
| CI | CW·$\overline{BB7}$+CV·BB7 |
| C6 | G7+(T7)CI |
| C5 | G6+(T6)G7+(T6·T7)CI |
| G57 | G5+(T5)G6+(T5·T6)G7 |
| T57 | T5·T6·T7 |
| C4 | G57+(T57)CI |
| C3 | G4+(T4)G57+(T4·T57)CI |
| C2 | G3+(T3)G4+(T3·T4)G57+(T3·T4·T57)CI |
| G24 | G2+(T2)G3+(T2·T3)G4 |
| T24 | T2·T3·T4 |
| C1 | G24+(T24)G57+(T24·T57)CI |
| C0 | G1+(T1)G24+(T1·T24)G57+(T1·T24·T57)CI |
| CX | G0+(T0)C0 |

FIG. 14

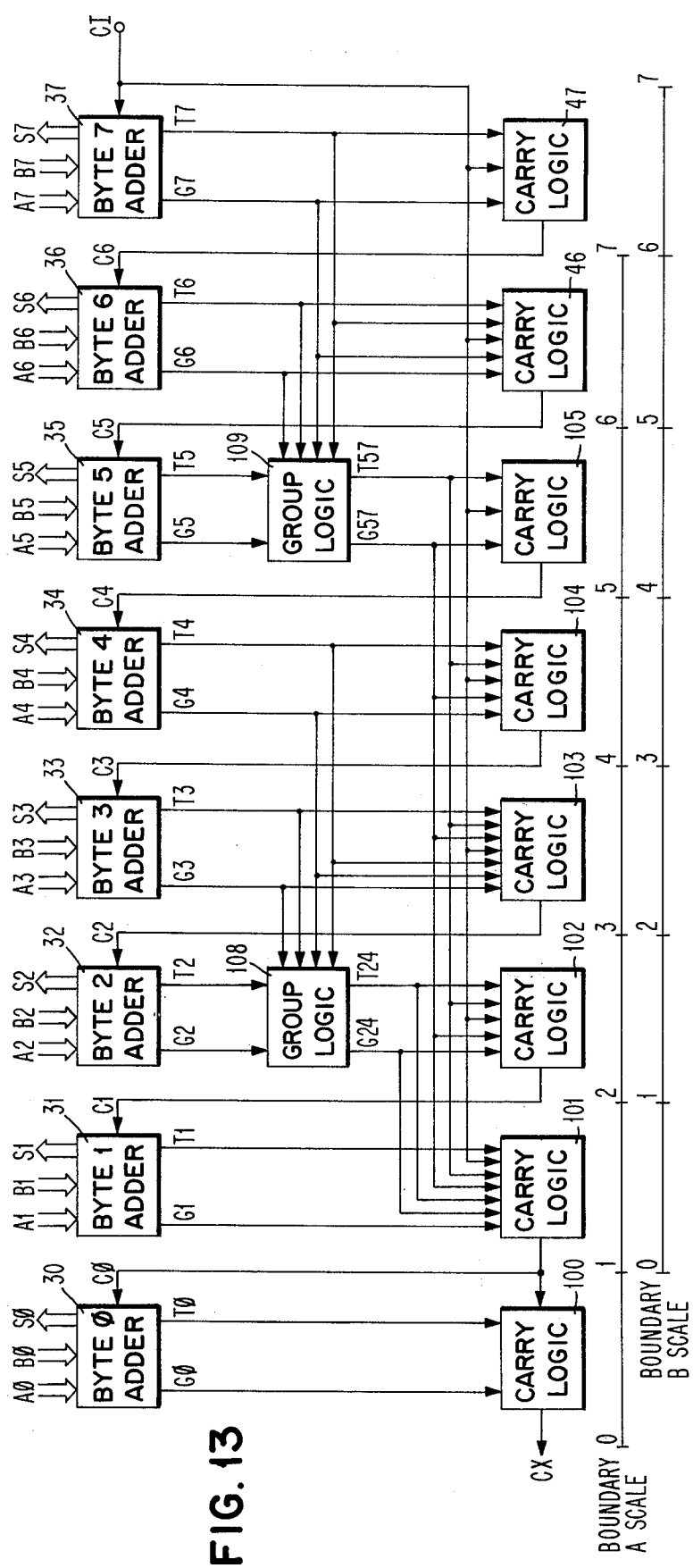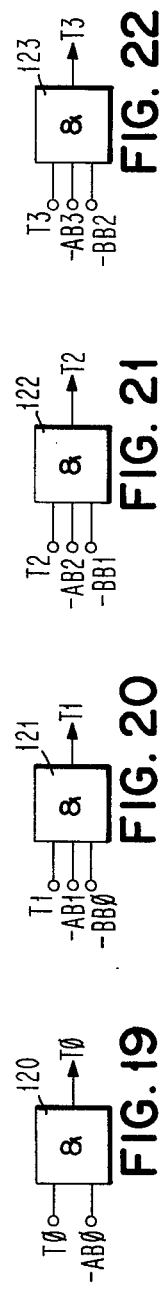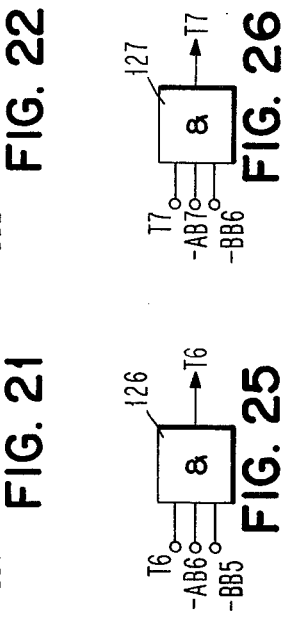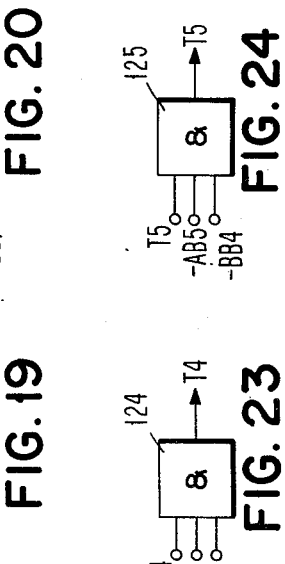

PARALLEL DIGITAL ARITHMETIC DEVICE HAVING A VARIABLE NUMBER OF INDEPENDENT ARITHMETIC ZONES OF VARIABLE WIDTH AND LOCATION

BACKGROUND AND SUMMARY OF THE INVENTION

This invention relates to parallel type electronic digital arithmetic devices, namely, parallel binary adders and parallel binary subtractors, for adding or subtracting two multidigit numbers to produce a resultant multidigit number representing the sum or difference of such two numbers. While not limited thereto, the present invention is particularly useful in the arithmetic and logic sections of relatively large scale digital computers and digital data processing machines.

Many and various types of electronic digital adders and subtractors have been heretofore used, and most of them operate with varying degrees of success in terms of speed and performance. Generally, such digital adders and subtractors have been used in digital computers and digital data processing machines wherein the adder or subtractor is but one of many functional components or elements making up the computer or machine. In such cases, it is the speed and performance of the machine as a whole which is the more important consideration. With this in mind, it is a primary purpose of the present invention to provide a new and improved high speed digital arithmetic device (adder or subtractor) having an increased degree of flexibility, which flexibility can be used to considerably improve the effective speed and performance of a digital computer or digital data processing machine.

One direction of continual emphasis in the computer industry is to build better and better machines capable of processing greater amounts of data in shorter lengths of time. One technique used in an effort to increase the speed of a computer is to increase the width of the data flow or, in other words, to increase the number of data bits which can be handled simultaneously by the functional elements and interconnecting data buses. The use of relatively wide data flow widths, however, gives rise to other problems which tend to reduce the effective speed of the machine. If, for example, an adder or subtractor having a relatively wide data flow width is used and it is desired to add or subtract data fields or data items of less than the full adder or subtractor width, then in many cases such data fields must be shifted all the way to the right or, in other words, right justified before they enter the adder or subtractor. This right justification takes time and is particularly objectionable where the data field is relatively small and located at or near the leftmost side of a relatively wide data flow. The present invention, however, enables the realization of an adder or subtractor of relatively wide data flow width which can be operated so as to eliminate the need to right justify data items of less than the full adder or subtractor width. This considerably increases the speed of performing arithmetic operations on such data items.

Another criticism with respect to relatively wide adders or subtractors is that when working with lesser width data fields, a goodly portion of the adder or subtractor may, in effect, remain idle. A further increase in the data processing speed could be obtained by simultaneously using such idle portion of the adder or subtractor to perform a second and separate arithmetic or logical function of either the same or a different type. For example, when using relatively short data fields, it would frequently be desirable to simultaneously perform two or three separate and different mathematical operations on different sets of data with one and the same adder or subtractor. This desirable result can also be accomplished by proper operation of an adder or subtractor constructed in accordance with the present invention.

An arithmetic device (adder or subtractor) constructed in accordance with the present invention provides a high degree of flexibility. It can be operated as one real wide arithmetic device or it can be operated as two or three independent arithmetic devices of lesser width. And the widths and locations of the individual arithmetic zones can be varied. Also, the arithmetic device can be operated as a single zone device of variable width or variable zone location or both. And, most importantly, the change from one operating condition to another can be accomplished quickly and automatically by the control words or microcode contained in the control storage portion of a microprogrammed computer data processor or by the hardware in the control section if the computer or data processor is not of the microprogrammed type. Thus, the arithmetic device can be switched from one condition to another to from one machine cycle or control word to the next.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 6 is a functional block diagram of a multibyte carry look-ahead type parallel adder employing full carry look-ahead with no grouping of the byte level generate and transmit functions;

FIG. 7 is a chart used in explaining the carry look-ahead functions of the FIG. 6 adder;

FIG. 9 is a functional block diagram showing in greater detail the internal construction of one byte adder of FIG. 8, the form of construction shown in FIG. 9 also employing full carry look-ahead with no grouping of bit level generate and transmit functions;

FIG. 10 is a fragmentary schematic diagram showing in considerable detail a representative form of construction for the rightmost three bit positions of the one byte adder of FIG. 9;

FIG. 12 is a chart used in explaining the operation of the one byte adder shown in FIG. 11;

FIG. 13 is a functional block diagram showing a modified form of construction for the multilayer adder of FIG. 6, such construction employing some grouping of byte level generate and transmit functions;

FIGS. 14–16 are charts used in connection with FIG. 13;

FIGS. 19–26 are logic circuit diagrams showing in greater detail representative forms of construction for the carry transmit disabling circuits (switching circuits 120–127) of FIG. 17;

DESCRIPTION OF THE PREFERRED EMBODIMENTS

Before describing the preferred embodiments, a few preliminary remarks are in order. In particular, the term "byte" is frequently used throughout the following description. The standard definition of "byte" is "a sequence of adjacent binary digits operated upon as a unit and usually shorter than a computer word." For sake of an example, it will be assumed herein that each byte is composed of eight binary data bits and a parity check bit. As is customary in the computer art, the parity check bit will usually not be mentioned and the byte will be spoken of as though it were composed of only eight binary digits or bits. Such omission will in no way affect a proper understanding of the present invention. Also, for sake of an example, it will be assumed herein that a computer word is made up of a sequence of four adjacent bytes or, in other words, a sequence of 32 data bits (and four parity check bits). It is to be understood, of course, that the invention is not limited to these particular examples. The invention will work equally as well with bytes and words of other sizes.

The term "field" or "data field" is used herein in a generic sense to refer to a sequence of adjacent binary digits without raising any inference or implication with respect to the number of digits in the sequence. The number of binary digits or bits in a field depends on the particular field being considered.

The term "parallel arithmetic device" is used herein as a generic term to include both parallel adders and parallel subtractors. The invention will be explained primarily with respect to parallel adders because these are more commonly used in present day data processors than are parallel subtractors. It should be borne in mind, however, that the principles of the present invention are also applicable to multidigit parallel subtractors.

Figures 1, 5:
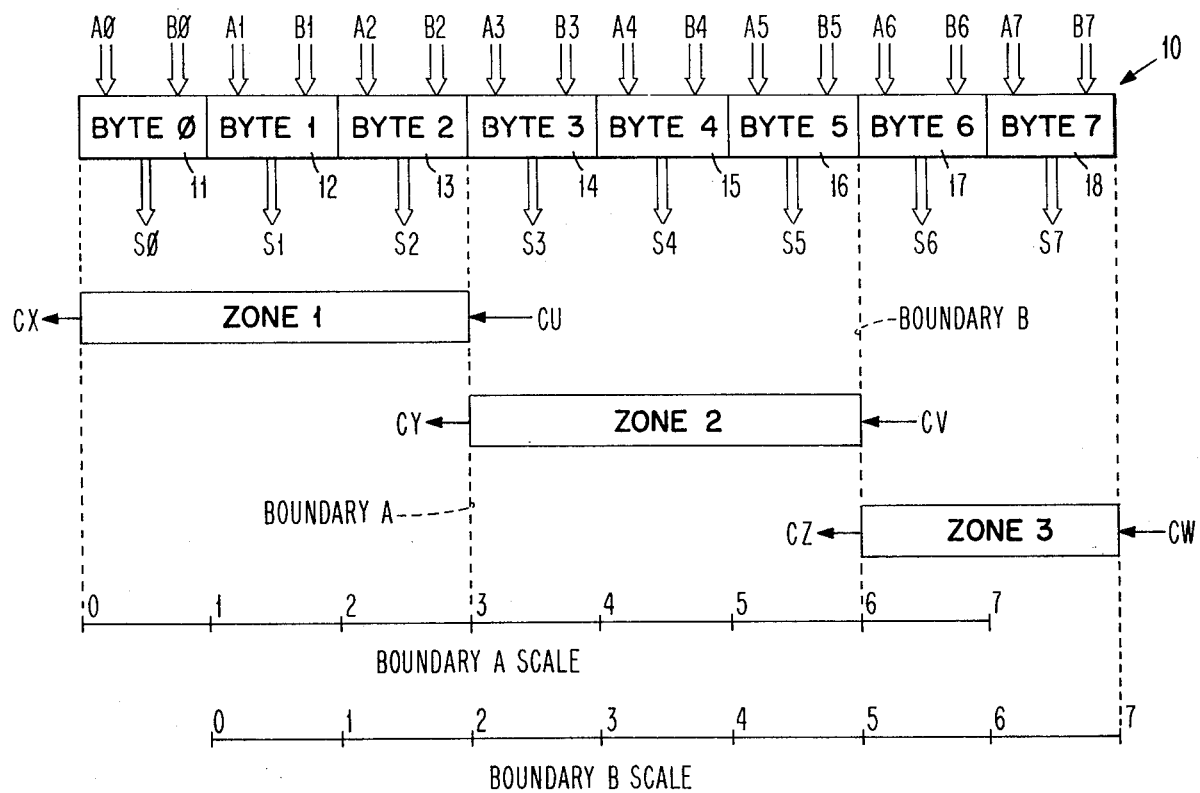
FIGS. 1–4 are diagrams showing different representative operating conditions for a parallel digital adder constructed in accordance with the present invention.
FIG. 5 is a chart showing some common examples of data field conditions which can be encountered in a relatively large scale general purpose digital computer.

Referring now to FIG. 1, there is shown a multidigit parallel arithmetic device represented by a multidigit parallel binary adder 10 and having a number of digit stages for arithmetically combining, in this case, adding, two multibit binary bit sequences. The parallel adder 10 is composed of a sequence of adjacent byte units 11–18. For sake of an example, the adder 10 is shown as having eight such byte units with the bytes being numbered as bytes 0 through 7. The order of significance of the bytes increases from right to left with byte 0 being the most significant byte and byte 7 being the least significant byte. Each of the byte units 11–18 includes eight binary digit stages. Each of the byte units 11–18 is thus capable of adding a first eight bit number (e.g., A3 for byte 3) to a second eight bit number (e.g., B3 for byte 3) and producing a resultant eight bit number (e.g., S3 for byte 3) representing the sum of such two numbers. The numbers added by adjacent byte units may, of course, be parts of a bigger number. Thus, for example, all eight bytes may be used to add a first 64 bit number to a second 64 bit number. Thus, the maximum overall data flow width of the adder 10 is eight bytes or 64 bits.

The lower portion of FIG. 1 illustrates the capability of the multibyte or multidigit adder 10 of being subdivided into three groups of contiguous digit stages with each group of digit stages operating as a parallel adder independently of the other groups. The three groups are identified as zones 1, 2 and 3. Each zone represents an independent parallel adder which is not affected by the other two zones. The boundary between zones 1 and 2 is defined as boundary A. The boundary between zones 2 and 3 is defined as boundary B. Both of these boundaries A and B are movable, that is, their locations can be varied across the width of the adder 10. In particular, boundary A can be positioned at any selected one of the eight locations numbered 0–7 and shown on the boundary A scale. Boundary B, on the other hand, can be positioned at any selected one of the eight locations numbered 0–7 and shown on the boundary B scale. It should be carefully noted that the numbers on the boundary B scale are offset to the right by a factor of one byte relative to the numbers on the boundary A scale. It is also noted that each of the selectable boundary locations either coincides with a boundary between adjacent bytes or with the left-hand or right-hand extremities of the adder 10. Thus, boundary A and boundary B are movable in byte size increments.

Independent external carry-in and carry-out lines are provided for each of zones 1, 2 and 3 and the connecting points or connections for the affected ones of such lines are automatically shifted in step with the movement of the zone boundaries A and B. The external carry-in and carry-out lines for zone 1 are identified as CU and CX, respectively. The external carry-in and carry-out lines for zone 2 are identified as CV and CY, respectively. The external carry-in and carry-out lines for zone 3 are identified as CW and CZ, respectively. Since the A and B boundaries are movable, the CU carry-in connection is made to the digit stage located immediately to the higher order side of boundary A and the CV carry-in connection is made to the digit stage located immediately to the higher order side of boundary B. In this description, the order of both the digits and the bytes increases from right to left. Thus, the higher order digits and bytes are on the left and the lower order digits and bytes are on the right. For the same reasons, the external carry-out connection CY is made to the digit stage located immediately to the lower side of boundary A, while the external carry-out connection CZ is made to the digit stage located immediately to the lower order side of boundary B. Thus, CU and CY move with boundary A and CV and CZ move with boundary B.

Figure 2:
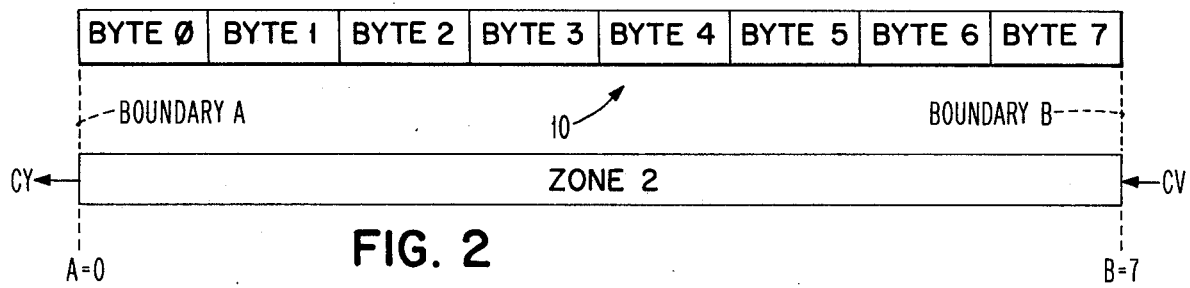

FIG. 2 illustrates the case where the adder 10 is to be operated as a single full width sixty-four bit adder. In this case, boundary A is positioned at location 0 on its scale and boundary B is positioned at location 7 on its scale. This stretches zone 2 out to cover the entire width of the adder 10. This, of course, causes zones 1 and 3 to disappear.

Figure 3:
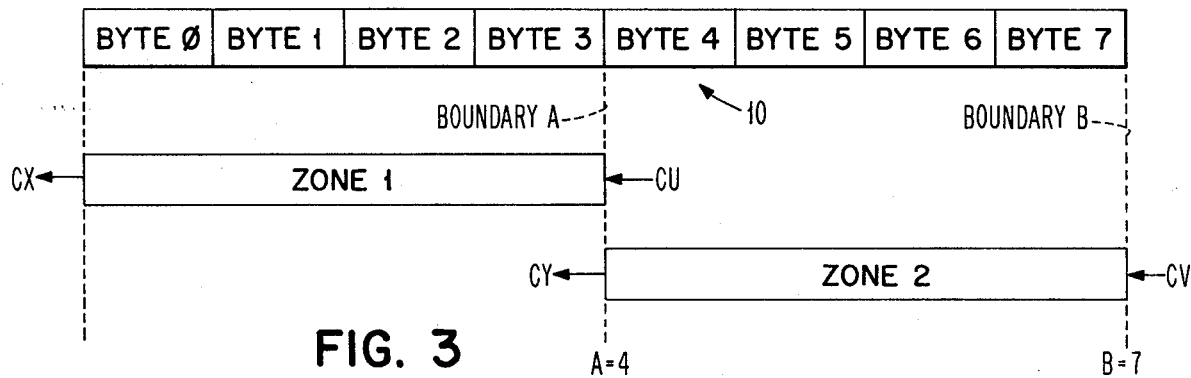
Figure 4:
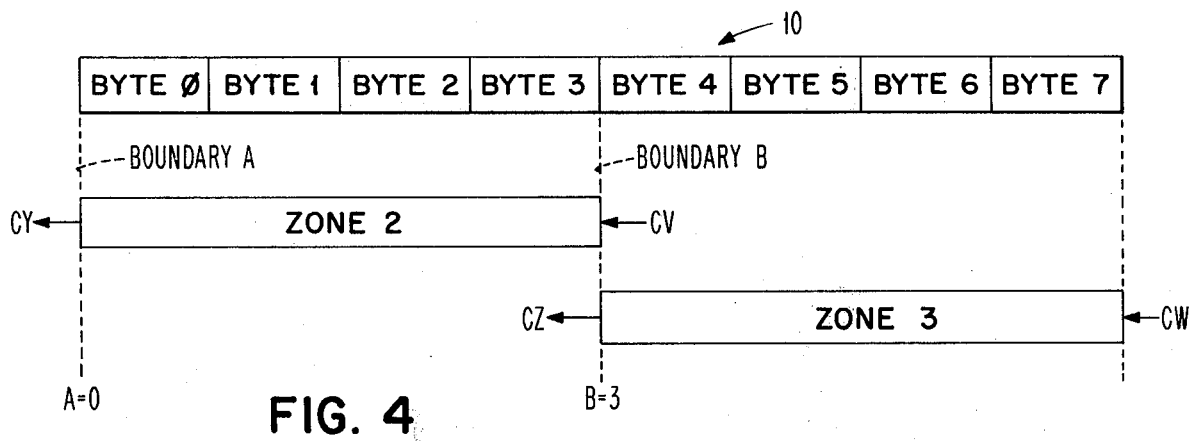

FIGS. 3 and 4 indicate the two possibilities where the adder 10 is to be subdivided into two separate zones, each four bytes in width. In FIG. 3, boundary A is positioned at A location 4 and boundary B is positioned at B location 7. This causes zone 1 to occupy the left half of the adder 10 and zone 2 to occupy the right half. In FIG. 4, boundary A is positioned at A location 0, and boundary B is positioned at B location 3. This causes zone 2 to occupy the left half of the adder 10 and zone 3 to occupy the right half.

As is implied by FIGS. 1–4, the different zones should never be allowed to overlap one another. This is accomplished by always keeping boundary A located to the left of boundary B. For the particular implementation example to be described hereinafter, boundary A should also not be allowed to coincide with boundary B. Thus, for the embodiment to be described, zone 2 should always be present. Zones 1 and 3, however, may or may not be present depending on the particular application at hand.

FIG. 5 is a chart showing some common examples of data fields that can be encountered in a large scale general purpose digital computer. The cross hatched portions represent the bytes required for each example. Without the present invention, the second, third, fifth and sixth examples would require that the data field be right justified before entering the adder. For the last or exponent update example, this would mean that the data field would have to be shifted seven bytes to the right before it entered the adder.

The ability of an adder constructed in accordance with the present invention to operate independently on selected contiguous bytes of the data flow eliminates the need for such right justification. This can be accomplished by setting the A and B boundaries to coincide with the extremities of the data field to be handled and operating zone 2 as an independent adder. For the explicit constant case, for example, boundary A would be positioned at A location 5 and boundary B would be positioned at B location 6. The CV carry-in connection would then provide the external carry-in to byte 6 and the CY carry-out connection would provide the external carry-out from byte 5. Thus, no shifting of the data field is required.

For some cases such as the single word left, the single word right and the exponent update examples where one extremity of the data field coincides with one of the extremities or sides of the adder, there are two possible choices as to the placement of the A and B boundaries. Such cases are like the two zone case considered in connection with FIGS. 3 and 4. In the exponent update case, for example, boundary A could be set at A location 0 and boundary B at B location 0 and the exponent update field processed by zone 2. Alternatively, boundary A could be set at A location 1 and boundary B could be set at B location 7 and the exponent update field processed by zone 1.

For the cases where neither extremity of the data field coincides with one of the adder extremities, then there is only one choice. In such cases, boundary A must be set to the left-hand extremity of the data field and boundary B to the right-hand extremity and the data field processed by zone 2. If consistency is desired when processing data fields in a singular manner, then the adder can be operated so that the data fields are always processed by zone 2.

As indicated by the examples shown in FIG. 5, an adder constructed in accordance with the present invention can be operated as a single zone adder of variable width or variable zone location or both. It is, of course, also possible and in a number of cases desirable to operate the adder to simultaneously perform independent additions or subtractions on more than one pair of numbers, subtraction being accomplished by complementing one of the numbers in each pair before it is supplied to the adder. Thus, for example, a first pair of numbers could be added by zone 1 simultaneously with the addition of a second pair of numbers in zone 2 and, if appropriate, simultaneously with the addition of a third pair of numbers in zone 3. By using the proper complementing circuitry (an example of which will be considered hereinafter), it is also possible to simultaneously perform an add operation in one zone and a subtract operation in another zone. The simultaneous performance of different operations in different zones is possible because the zones operate independently of one another. In particular, the carry-out from one zone does not affect the carry-in to the next zone.

As is known, parallel adders can be classified into two main categories according to how the carries are handled. The adders in one category are called "ripple adders" and the adders in the other category are called "carry look-ahead adders." In a ripple adder, the overall carry circuitry forms a serial string and the carry signals must ripple down the string from one digit stage to the next. In a carry look-ahead adder, on the other hand, the carry-in for one stage is not dependent on the carry-out for the previous stage. Instead, all of the various carry-in signals are simultaneously determined by carry logic circuitry which operates in parallel with the addition performing part of the adder circuitry. Thus, one stage does not have to wait on the preceding stages before it gets its carry-in signal. Thus, carry lookahead type adders are much faster than ripple type adders, particularly in a case like the present embodiment where the overall width of the adder is quite large (e.g., 64 bits). For this reason the preferred embodiment of the present invention is a parallel adder of the carry look-ahead type.

As is known, the carry logic in a carry look-ahead type adder is considerably more complex and more involved than that in a ripple type adder. Such added complexity would appear to make the implementation of the present invention in the form of a carry look-ahead adder a very difficult if not impossible matter. Fortunately, however, as will be hereinafter seen, a novel carry look-ahead implementation has been devised which can accomplish the desired purposes without excessive added complications.

Referring to FIG. 6, there is shown in greater detail the construction of a multibyte parallel adder of the carry look-ahead type. The particular adder shown in FIG. 6 employs carry look-ahead with no byte level grouping of generate and transmit functions. The FIG. 6 adder includes eight byte size sections 20–27. Each section includes a one byte adder and a carry logic unit. Thus, section 20 includes adder 30 and carry logic 40, section 21 includes adder 31 and carry logic 41, etc. Each carry logic unit produces the carry-in signal for the adder in the next higher order section. As mentioned, the order increases from right to left with section 20 being the highest order section and section 27 being the lowest order section. Thus, the carry logic 47 produces the carry-in signal C6 for the adder 36 in section 26, the carry logic 46 produces the carry-in signal C5 for the adder 35 in section 25, etc.

Each of the one byte adders 30–37 operates to add a first eight bit number (e.g., A5 for adder 35) to a second eight bit number (e.g., B5 for adder 35) to produce a resultant eight bit number (e.g., S5 for adder 35) representing the sum of the first two numbers. The carry-In signals C0–C6 and CI serve to interconnect the adders 30–37 so as to provide an eight byte (64 bit) adder capable of adding two eight byte (64 bit) numbers.

In order to provide the desired carry look-ahead action, each of the adders 30–37 also produces a byte level carry "generate" signal and a byte level carry "transmit" signal. The carry generate signals are designated as G0–G7, while the carry transmit signals are designated as T0–T7. Each of these signals is a binary signal having a binary value of either one or zero. During the process of adding two input numbers, the generate signal for any given adder stage will assume a binary one value if such stage would internally generate a carry-out signal regardless of the presence or absence of a carry-in signal to such stage. Otherwise, the generate signal signal remains at a binary zero value. During the process of adding two input numbers, the transmit signal for a given stage will assume a binary one value if the condition of such stage is such that the presence of a carry-in signal to such stage would cause such stage to produce a carry-out signal. In other words, the transmit signal having a value of one indicates that the adder stage is in a condition such that a carry-in to the stage will be transmitted therethrough and appear as a carry-out at the high order end thereof. When the stage is not in such condition, the transmit signal assumes a value of zero. The carry-in signals C0–C6 and CI are also binary signals and assume a value of one when a carry-in is present and a value of zero when there is no carry-in.

In general, the carry-in CN to the Nth byte adder (excluding the lowest order or byte 7 adder) is described by the following logical expression:

$$CN = G(N+1) + T(N+1) \cdot C(N+1) \tag{1}$$

where CN is the carry-in to the Nth stage, G(N+1) is the generate signal produced by the next lower order byte adder, T(N+1) is the transmit signal for the next lower order byte adder and C(N+1) is the carry-in to the next lower order byte adder. The plus (+) symbol not within the parentheses denotes the logical "OR" function and the dot (·) symbol denotes the logical "AND" function.

In this manner, the carry-in C6 to the byte 6 adder 36 is described by the logical expression:

$$C6 = G7 + T7 \cdot CI \tag{2}$$

where G7 and T7 are the generate and transmit signals for the preceding byte 7 adder 37 and CI is an external carry-in signal to the byte 7 adder 37. This expression says that there are two conditions which will produce a carry-in to the byte 6 adder. In particular, the G7 term denotes that there will be a C6 carry-in if the byte 7 adder 37 internally generates a carry signal. The T7·CI term denotes that there will also be a C6 carry-in if the byte 7 adder is in a carry transmit condition and there is a carry-in CI to the byte 7 adder. Carry logic 47, which produces the C6 signal, operates in accordance with equation (2). In other words, it receives the G7, T7 and CI signals and produces the C6 carry signal.

The C5 carry-in signal for the byte 5 adder 35 is described by the following logical expression:

$$C5 = G6 + T6 \cdot C6 \tag{3}$$

where G6 and T6 are the generate and transmit signals for the byte 6 adder and C6 is the carry-in signal to the byte 6 adder. Substituting equation (2) into equation (3) and expanding terms gives:

$$C5 = G6 + T6 \cdot G7 + T6 \cdot T7 \cdot CI \tag{4}$$

Equation (4) describes the logic for the carry logic unit 46 which produces the C5 carry-in signal. It indicates that there are three conditions which can give rise to a C5 carry-in. One case is where the preceding byte 6 adder would internally generate a carry signal (G6 = 1). Another case is where the preceding byte 6 adder is in a carry transmit condition (T6 = 1) and the stage before that, namely, the byte 7 adder, would internally produce a carry signal (G7 = 1). The third case is where both of the preceding lower order stages are in a carry transmit condition (T6 = 1 and T7 = 1) and there is an external carry-in (CI = 1).

In a similar manner, the carry-in signal C4 for the byte 4 adder 34 is described by the following logical expression:

$$C4 = G5 + T5 \cdot C5 \tag{5}$$

Substituting the value of C5 from equation (4) into equation (5) and expanding terms gives the following expression for C4:

$$C4 = G5 + T5 \cdot G6 + T5 \cdot T6 \cdot G7 + T5 \cdot T6 \cdot T7 \cdot CI \tag{6}$$

Equation (6) describes the logic executed by the carry logic unit 45 to produce the carry-in signal C4 for the byte 4 adder.

The logical relationships for all of the various carry-in signals C6–C0 plus the final carry-out signal CX are set forth in the chart of FIG. 7. To make it easier to see what's happening, the transmit signals associated with each generate signal are grouped within a set of parentheses. In this instance, the trailing or closing parenthesis symbol also denotes the logical AND function. The expressions for the carry-ins C3, C2, etc., are obtained by continuing the process described above for carry-ins C6, C5 and C4. The logical expression for C3 describes the logic performed by carry logic 44, the expression for C2 describes the logic performed by carry logic 43 and so forth.

As is seen from the chart of FIG. 7, the carry logic becomes more and more complex as one moves across the FIG. 6 adder from right to left. Thus, for example, the logical expression for the final carry signal CX involves some nine terms and the CX carry logic 40 receives the generate and transmit signals from all of the preceding lower order sections plus the carry-in signals CI to the lowest order section. Similarly, each of the other carry logic units 41, 42, etc., receive all of the generate and transmit signals from all of the preceding lower order sections as well as the carry-in CI.

The reason a carry look-ahead type adder such as that shown in FIG. 6 is faster than a ripple type adder is that in the carry look-ahead adder all of the carry signals are generated in a simultaneous manner and in parallel with and at the same time that the additions are being performed by the various byte adders 30–37. Thus, a higher order adder does not have to wait and see if a carry is going to ripple down the chain to it from some lower order stage.

The significance of the expression for the external carry-in signal CI will become more apparent hereinafter. It has to do with the boundary switching mechanism. What it says is that CI will be equal to CW if boundary B is not positioned at B location 7 or, on the other hand, will be equal to CV if boundary B is at B location 7.

It is important to bear in mind that each of the one byte adders 30–37 of FIG. 6 is an eight bit adder capable of adding two eight bit numbers. Thus, each of these one byte adders can be represented in the manner shown in FIG. 8, which, for sake of generality, is labeled as the byte N adder. This byte N adder adds a first eight bit number.

$$AN = (a0, a1, a2, \ldots, a7) \tag{7}$$

to a second eight bit number
$$BN = (b0, b1, b2, \ldots, b7) \tag{8}$$

to produce a resultant eight bit sum
$$SN = (s0, s1, s2, \ldots, s7) \tag{9}$$

where the small $a$'s, $b$'s and $s$'s are the binary digits of the respective numbers.

Figure 8:
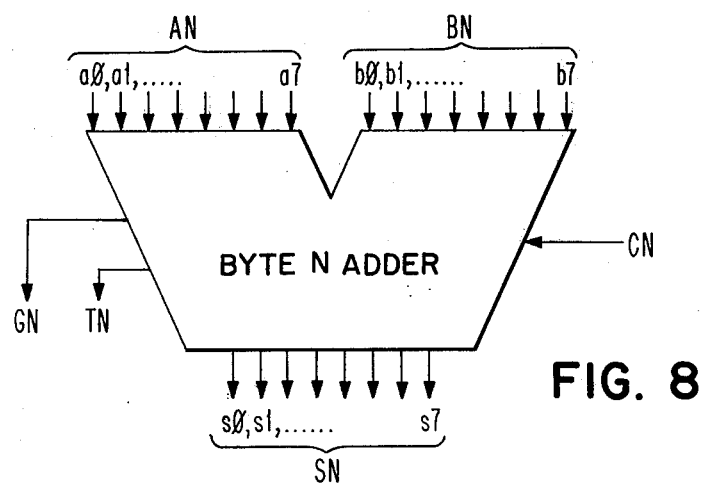
FIG. 8 is a functional representation of a one byte adder corresponding to one of the individual byte adders shown in FIG. 6.

FIG. 9 shows a representative form of internal construction for the one byte adder of FIG. 8. As indicated in FIG. 9, the one byte adder is also a parallel adder of the carry look-ahead type. Except for the GN and TN terms, it is exactly analogous to the FIG. 6 multibyte adder except that it operates at the bit level as opposed to the byte level. The small $g$'s, $t$'s and $c$'s in FIG. 9 denote the generate, transmit and carry-in signals for the various bits. Thus, the FIG. 9 adder is comprised of eight bit size sections 50–57, each having a bit adder (e.g., 64 for section 54) and a carry logic unit (e.g., 74 for section 34).

The bit level carry-in signals $c0$–$c6$ are described by the same relationships as given for the corresponding byte level carry-in signals C0–C6 in FIG. 7 except that lower case $g$'s and $t$s are substitued for the capital G's and T's and CN is substituted for CI. The GN signal, which denotes the general signal for the byte as a whole (all of a bit sections 50–57), is described by the expression for the CX signal in FIG. 7 provided that the last term involving CI is omitted. In other words, the byte level generate signal GN is dependent on all the various bit level generate signals $g0$–$g7$. The TN signal represents the transmit signal for the byte as a whole (all of bit sections 50–57) and is described by the following logical expression:

$$TN = t0 \cdot t1 \cdot t2 \cdot t3 \cdot t4 \cdot t5 \cdot t6 \cdot t7 \tag{10}$$

This corresponds to the last term of the CX expression with the carry-in factor CI omitted. Thus, the byte as a whole is in a carry transmit condition (TN = 1) when all eight of the bit adders are in a carry transmit condition.

FIG. 10 shows in greater detail the construction of the three rightmost or lower order bit positions 55–57 of the bit level adder of FIG. 9. As is known, the sum digit for the nth stage in a multibit adder is described by the logical expression.

$$sn = an \; \forall \; bn \; \forall \; cn \tag{11}$$

where the symbol $\forall$ denotes the logical EXCLUSIVE OR function. For the bit 6 adder 66, for example, the relationship of equation (11) is executed by means of EXCLUSIVE OR circuits 80 and 81.

The general expression for the carry generate signal for the nth bit is:

$$gn = an \cdot bn \tag{12}$$

where the dot symbol denotes the logical AND function. For the bit 6 adder 66, for example, this relationship of equation (12) is executed by an AND circuit 82. Thus, bit 6 will produce a carry generate signal ($g6 = 1$) when both of the incoming digits $a6$ and $b6$ are at the one level. This represents the case where the bit 6 adder would produce a carry-out signal on its own and regardless of the presence or absence of a $c6$ carry-in signal.

The general expression for the carry transmit signal for the nth stage is:

$$tn = an + bn \tag{13}$$

where the plus (+) symbol denotes the logical OR function. For the bit 6 adder 66, for example, this relationship is executed by an OR circuit 83. Thus, if either of the incoming digits $a6$ or $b6$ is at the one level, the transmit signal $t6$ is at the one level to denote that the bit 6 adder would normally produce a carry-out if it should receive a carry-in. The fact that $t6$ is also at the one level when both $a6$ and $b6$ are one represents a harmless departure from strict logic because a $c5$ carry-in would be produced by the $g6$ generate signal anyway and the duplication of effort is not prejudicial.

The general expression for the carry-in signal cn to the nth bit adder is:

$$cn = g(n+1) + t(n+1)c(n+1) \quad (14)$$

where $g(n+1)$ and $t(n+1)$ and $c(n+1)$ are the generate, transmit and carry-in signals for the preceding lower order bit adder. Thus, the carry-in signal $c6$ for the bit 6 adder is:

$$c6 = g7 + t7 \cdot CN \quad (15)$$

Similarly, the $c5$ carry-in signal for the bit 5 adder is:

$$c5 = g6 + t6 \cdot c6 \quad (16)$$

Substituting equation (15) into equation (16) and expanding terms gives the following expression for the $c5$ carry-in signal:

$$c5 = g6 + t6 \cdot g7 + t6 \cdot t7 \cdot CN \quad (17)$$

The relationship of equation (17) represents the logic which is executed by the carry logic 76. As indicated in FIG. 10, this logic is executed by AND circuits 84 and 85 and OR circuit 86.

As can be appreciated from the way the carry lookahead logic grows as one progresses to higher and higher order stages, the circuit fan-in and fan-out requirements quickly reach the point where the fan-in and fan-out capabilities of most practical forms of present day computer logic circuits are exceeded. For this reason, it is customary in practice to subdivide a multistage parallel adder into groups of stages and to generate so-called "group" generate and "group" transmit signals which are analogous to the individual bit level generate and transmit signals. In fact, the byte level generate and transmit signals G0–G7 and T0–T7 represent such a grouping. However, this is not enough. Even for the eight stage bit level adder of FIG. 9, the fan-in and fan-out requirements are greater than desired. Consequently, it is desirable to use the grouping technique even within the one byte adder of FIG. 9.

Figure 11:
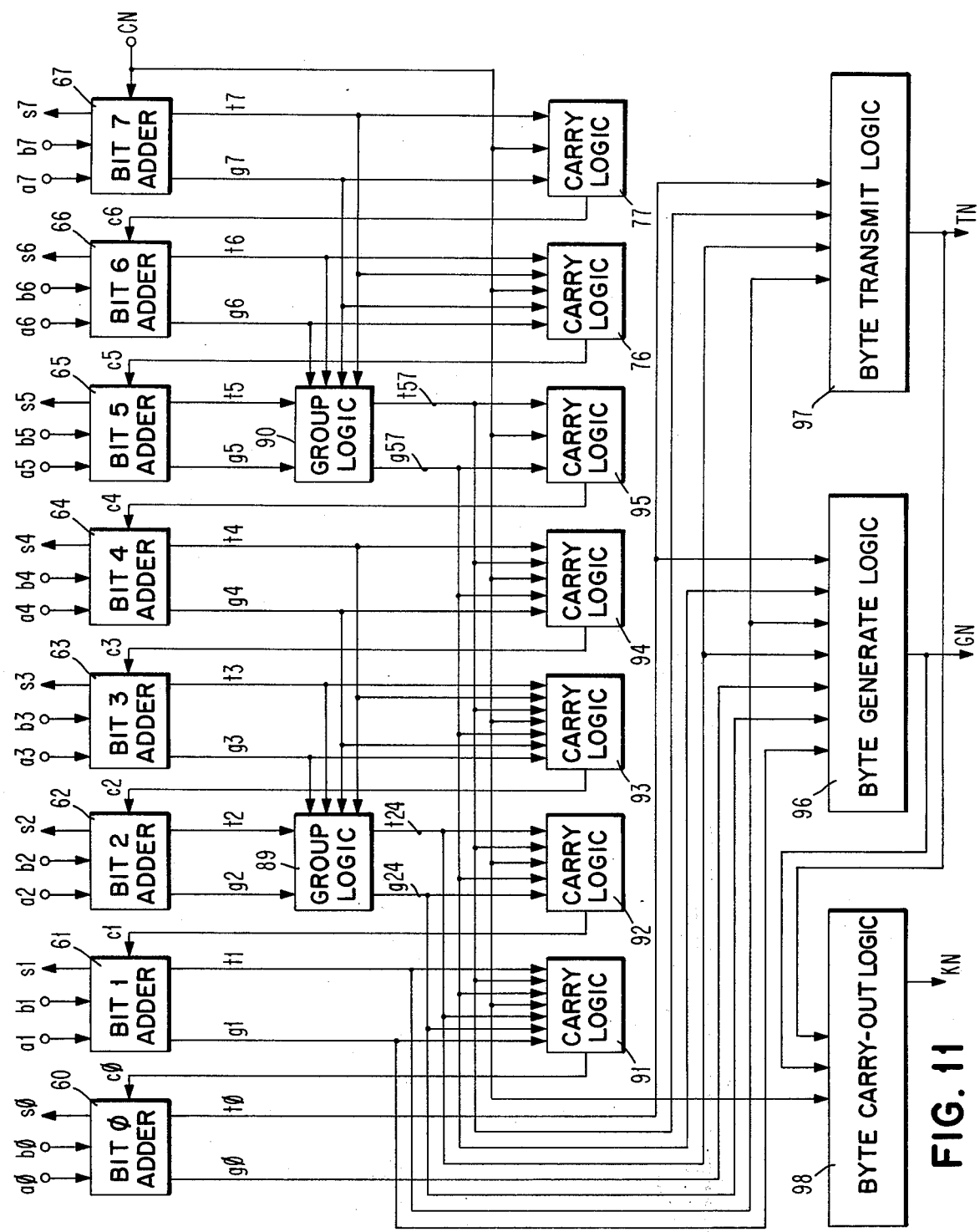
FIG. 11 is a functional block diagram showing a modified form of construction for the one byte adder of FIG. 8, such construction employing some grouping of bit level generate and transmit functions.

Referring now to FIG. 11, there is shown a modified form of construction for the FIG. 9 one byte adder, which modified construction employs the technique of grouping some of the bit level generate and transmit functions. Bit adders 60–67 are the same as before and so are the two lower order carry logic units 76 and 77. The departure commences with the provision of group logic units 89 and 90. Group logic 90 groups the $g5$–$g7$ and $t5$–$t7$ generate and transmit functions to produce in lieu thereof a group generate signal $g57$ and a group transmit signal $t57$. The manner of grouping is indicated by the $g57$ and $t57$ entries in the chart of FIG. 12. These group signals are used by the carry logic unit 95 to generate the $c4$ carry-in signal for the bit 4 adder. The applicable relationship is indicated in FIG. 12. Thus, the logic of carry logic unit 95 is simpler than that of the corresponding previously considered carry logic unit 75. The effect on the $c4$ carry-in signal is, however, the same. This can be seen by substituting the group relationships for $g57$ and $t57$ into the new relationship for $c4$ shown in FIG. 12. When this is done, it is seen that the logic for $c4$ is the same as before.

The modified logic for the $c2$ and $c3$ carry logic units 93 and 94 is given in the chart of FIG. 12

The second group logic unit 89 performs the same tyep of grouping action for the $g2$–$g4$ and the $t2$–$t4$ generate and transmit signals. The logical expressions for the resulting group signals $g24$ and $t24$, as well as the modified logic for carry logic units 91 and 92 are set forth in the table of FIG. 12. FIG. 12 also gives the logical relationships executed by byte generate logic 96, byte transit logic 97 and byte carry-out logic 98. The byte generate signal GN represents the group generate signal for the eight bit adder as a whole, while the byte transmit signal TN represents the group transmit signal for the eight bit adder as a whole. The byte carry-out signal KN represents the carry-out for the one byte or eight bit adder as a whole. The purpose to which this byte carry-out signal KN is put will be explained hereinafter.

Referring now to FIG. 13, there is shown a modified form of a multibyte adder of FIG. 6. The modified construction shown in FIG. 13 uses the same grouping technique as used in FIG. 11 for the one byte adder. The logical relationships executed by the modified carry logic units 100–105 and the group logic units 108 and 109 are set forth in the chart of FIG. 14. Except for the CI and CX terms, these relationships are generally the same as the corresponding bit level relationships set forth on the bit carry logic chart of FIG. 12. The significance of the more involved relationship for CI will be explained hereinafter.

The multibyte carry look-ahead adder of FIG. 13 is a very good example of the kind of multidigit adder which can be used to implement the teachings of the present invention. For this reason, there will be provided for the FIG. 13 adder a pair of movable boundaries A and B which can be moved in increments of one byte and which can be used to subdivide the adder of FIG. 13 into two or three independent adders in manner described in connection with FIGS. 1–4.

In order to establish a boundary between two adjacent byte sections in FIG. 13, it is necessary to, in effect, sever the carry look-ahead circuitry at the desired boundary so that the byte sections to the right of the boundary will not affect the byte sections to the left of the boundary. At the same time, it is necessary that the carry look-ahead circuitry to the left of the boundary still function in the correct manner for the byte sections to the left of the boundary. It is also desired to provide an external carry-in connection for the byte sections to the left of the boundary. With respect to the FIG. 13 embodiment, these objectives are accomplished by doing two things, namely: (1) disabling the carry transmit signal produced by the byte adder located immediately to the lower order side (right side) of the boundary; and (2) substituting an external carry-in signal for the carry generate signal produced by the byte adder located immediately to the lower order side (right side) of the boundary.

For example, to place boundary A between byte 2 and byte 3, it is necessary to disable the T3 transmit signal from the byte 3 adder such that the T3 line will remain at the binary zero level. It is also necessary to substitute the external carry-in signal for boundary A, namely, the external carry-in signal CU, for the G3 generate signal produced by the byte 3 adder. When these things are done, bytes 0, 1 and 2 will function as an independent carry look-ahead adder and its operation will be completely independent of and unaffected by the operation of the byte sections on the lower order or right side of boundary A.

This result can be verified by using the complete logic expressions set forth in FIG. 7 and setting the T3 terms to zero and substituting CU for the G3. Doing this gives the following expressions for the C2, C1 and C0 byte carry-in signals:

$$C2 = CU \quad (18)$$

$$C1 = G2 + T2 \cdot CU \quad (19)$$

$$C0 = G1 + T1 \cdot G2 + T1 \cdot T2 \cdot CU \quad (20)$$

Thus, the desired carry look-ahead action is maintained on the higher order side of the boundary and yet this carry look-ahead action is not affected by the carry look-ahead circuitry on the lower or right side of the boundary.

The same proof can be made by using the grouped byte carry relationships in the chart of FIG. 14, but it is believed to be easier to visualize what's happening by using the more detailed FIG. 7 expressions.

A similar type of result can be shown for each of the other possible locations of boundary A.

The same type of procedure is used to establish boundary B. Thus, to establish boundary B at a given location, it is necessary to disable the carry transmit signal produced by the byte adder located immediately to the lower order side of the desired boundary location and to substitute the boundary B carry-in signal CV for the byte generate signal produced by the byte adder located immediately to the lower order side of the desired boundary location.

The charts of FIGS. 15 and 16 are for boundary A and boundary B, respectively. These charts summarize the transmit disabling actions and the carry-in substitution actions which are required to position boundary A and boundary B at the different boundary locations. Thus, using the chart of FIG. 15, to establish boundary A at location 6, for example, requires that T6 be set to zero and that G6 be replaced by the external carry-in signal CU. It should be remembered, as is indicated by the boundary A and boundary B scales shown across the bottom of FIG. 13, that the numbering of the boundary B locations is offset one byte to the right with respect to the numbering of the boundary A locations. Also, to repeat what was said earlier, the numerical value of the selected boundary A location must not be allowed to exceed the numerical value of the selected boundary B location. Otherwise, things will become overlapped and there will be a confused mixture of data bits.

It is noted in passing that if there was no interest in providing external carry-in signals, the establishment of the boundaries would be even simpler. In such a case, to establish a boundary, it would only be necessary to disable the generate and transmit signal lines coming from the byte adder located immediately to the lower order side of the boundary. An adder without an external carry-in line, however, is not very useful in the ALU section of a digital computer, and hence this type of an application will not be given further consideration in this description.

It is also generally desirable to provide carry-out signals from the different independent adder zones established by the movable boundaries. The manner of doing this will be discussed in connection with the detailed embodiment to be described hereinafter.

Figure 17:
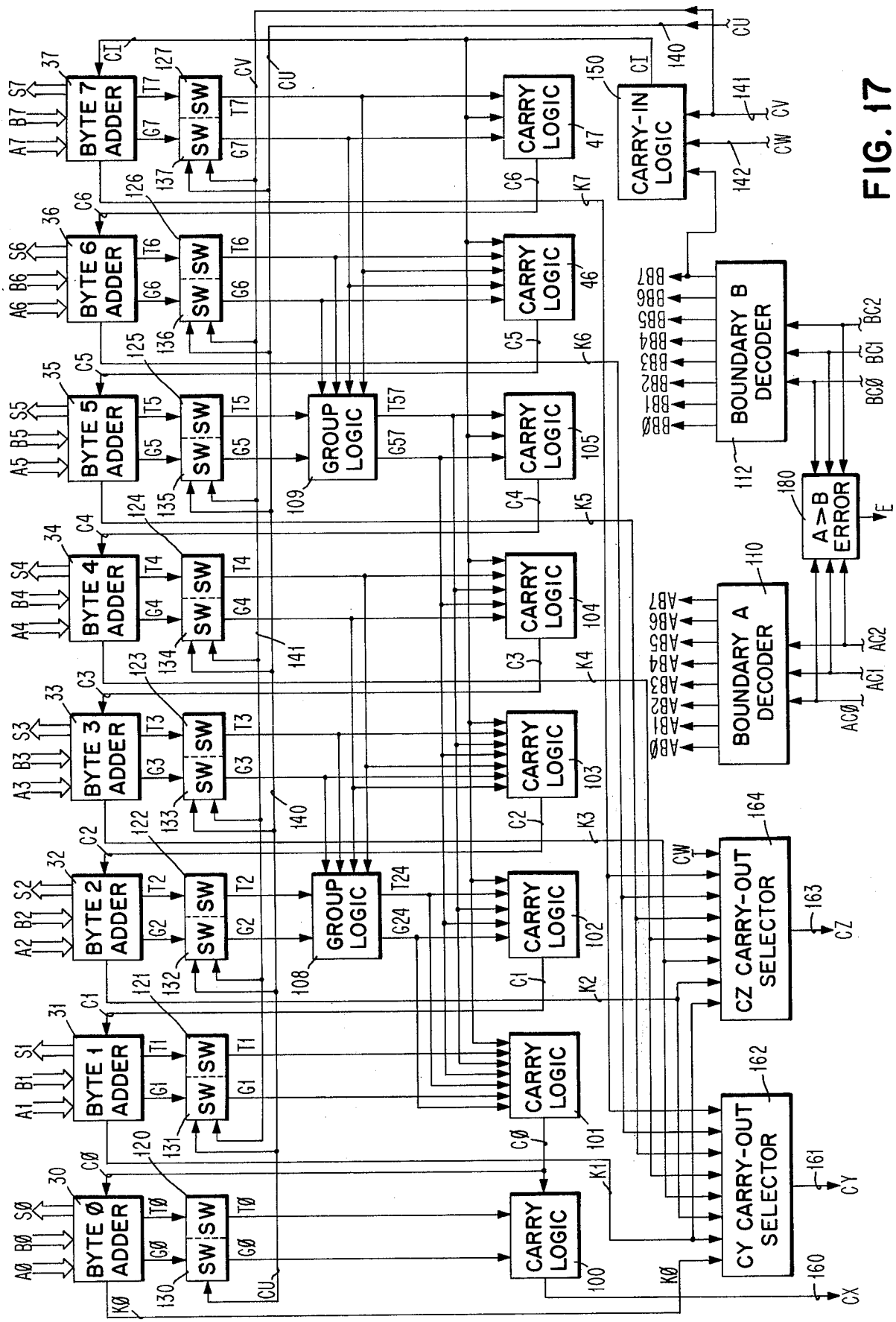
FIG. 17 is a functional block diagram of a multibyte adder similar to the one shown in FIG. 13 but further including circuitry for providing the movable boundaries.

Referring now to FIG. 17, there is shown a functional block diagram on a multibyte parallel binary adder of the carry look-ahead type and similar to the one shown in FIG. 13, but further including circuitry for providing the movable boundaries. The adder of FIG. 17 includes multidigit parallel adder circuitry having a number of digit stages. Such adder circuitry includes the eight one byte adders 30–37. Each of these adders 30–37 is of the same construction as the one byte adder shown in FIG. 11. Since each of the adders 30–37 includes eight binary digit stages, the adder of FIG. 17 as a whole includes a total of 64 binary digit stages.

The FIG. 17 binary adder also includes carry circuitry for generating carry-in signals for each digit stage. This carry circuitry is of the carry look-ahead type and includes the bit level carry logic units 76, 77 and 91–95 and the bit level group logic units 89 and 90 shown in FIG. 11 and located within each of the one byte adders 30–37, together, with the byte level carry logic units 46, 47 and 100–105 and the byte level group logic units 108 and 109 shown in FIG. 17. This carry look-ahead carry circuitry is of a multilevel grouped type. A first level of grouping is represented by the group logic units 89 and 90 located within each of the one byte adders 30–37. A second level of grouping is represented by the byte generate logic 96 and the byte transmit logic 97, also located within each of the one byte adders 30–37. A third level of grouping is represented by the group logic units 108 and 109 shown in FIG. 17.

The FIG. 17 embodiment can be thought of in two different ways. One way might be termed a bit level point of view. In this case, each one of the 64 bit stages is thought of as being an adder stage. Another way of looking at the FIG. 17 embodiment might be termed a byte level point of view. In this latter case, each of the one byte adders 30–37 is thought of as being an adder stage. Both points of view are perfectly legitimate. The one which is easier to use depends on the placement of spacing of the various selectable boundary locations. If the boundaries are to be movable in one byte increments with the selectable locations coinciding with the boundaries between the bytes, then it is generally more convenient to think of each of the one byte adders as being an adder stage. If, on the other hand, the movable boundaries are to be movable in increments of less than one byte, then it is more convenient to think of each bit stage or each group of bit stages as constituting an adder stage. In other words, for purposes of explanation, it is easier to think of the bit stages located between adjacent selectable boundary positions as a group and to think of such group as constituting an adder stage.

In the embodiment shown in FIG. 17, the movable boundaries are movable in one byte increments. For this reason, it is generally more convenient to think of each of the one byte adders 30–37 as being an adder stage. The present invention, however, is not to be limited to this particular size of boundary locations spacing or to this particular byte size grouping of bit stages. The present invention is equally applicable to boundary movement increments and bit groupings to other sizes. Also, the selectable boundary locations need not necessarily be evenly spaced across the width of the adder.

Returning to the circuitry shown in FIG. 17, such embodiment includes carry generate circuitry for producing a carry generate signal for each adder stage and carry transmit circuitry for producing a carry transmit signal for each adder stage. On a bit level basis, this circuitry includes the carry generate and carry transmit circuits located in each of the bit adders 60–67 (FIG.

11) for producing the $g0$–$g7$ and the $t0$–$t7$ generate and transmit signals. An example of a carry generate circuit is represented by the AND circuit 82 of FIG. 10 and an example of a carry transmit circuit is indicated by the OR circuit 83 of FIG. 10. On a byte level basis, on the other hand, the carry generate circuitry and the carry transmit circuitry are represented by the byte generate logic 96 and the byte transmit logic 97 shown in FIG. 11 and located in each of the one byte adders 30–37 of FIG. 17. As previously indicated, these logic units 96 and 97 execute the GN and TN relationships set forth in the chart of FIG. 12. Thus, on a byte level basis, the carry generate signals are represented by the G0–G7 signals shown in FIG. 17 and the carry transmit signals are represented by the T0–T7 signals shown in FIG. 17.

The FIG. 17 embodiment further includes carry look-ahead circuitry responsive to the carry generate and carry transmit signals for producing carry-in signals for the various adder stages. On a bit level basis, this carry look-ahead circuitry includes the carry logic units 76, 77 and 91–95 and the group logic units 89 and 90 shown in FIG. 11 and included in each of the one byte adders 30–37. On a byte level basis, this carry look-ahead circuitry includes the carry logic units 46, 47 and 100–105 and the group logic units 108 and 109 shown in FIG. 17.

The FIG. 17 adder also includes circuitry for selecting a group of contiguous byte stages in the adder circuitry represented by the one byte adders 30–37 and for operating the selected byte stages as a parallel adder independently of the nonselected stages. The FIG. 17 adder further includes circuitry for varying the size of the selected group of byte stages, such size being variable over a range having a maximum value corresponding to the total number of stages in the adder and a minimum value substantially less than, like less than one half or less, the total number of stages. This circuitry for varying the size of the selected group includes first and second boundary selection circuitry for varying the locations of a pair of movable boundaries, namely, boundary A and boundary B.

The boundary selection circuitry for varying the location of the A boundary includes a boundary A decoder 110 which receives a coded three-bit boundary A control signal AC, the individual bits of which are identified as AC0, AC1, AC2. The decoder 110 decodes this incoming signal and in response thereto energizes a particular one of the eight possible output lines labeled AB0–AB7. The particular output line which is energized or set to the binary one level depends on the coding of the incoming signal. Each of the decoder 110 output lines AB0–AB7 corresponds to a particular one of the eight possible boundary A locations. Output line AB0 is energized when it is desired to place boundary A at location 0, output line AB1 is energized when it is desired to place boundary A at location 1, etc. The relationships between the code values of the incoming control signal AC, the decoder output lines AB0–AB7 and the boundary A locations are described by the first two columns on the left in the chart of FIG. 15. The second column gives the various possible code values for the incoming boundary control signal AC, while the first column indicates the corresponding boundary locations and, hence, decoder output lines. Thus, for example, if the coding of the incoming AC signal is 110, then boundary A location 6 is selected and decoder output line AB6 is energized or set to the binary one level.

The boundary selection circuitry for varying the location of the second boundary, namely, boundary B, includes a boundary B decoder 112 which is constructed to receive a coded three-bit boundary B control signal BC, the individual bits of which are identified as BC0, BC1 and BC2. Decoder 112 decodes the incoming BC control signal and energizes a particular one of its eight possible output lines labeled BB0–BB7. Each of these output lines corresponds to a different one of the eight possible boundary B locations. BB0 is energized or set to the binary one level to cause boundary B to be placed at location 0, BB1 is energized to cause boundary B to be placed at location 1, etc. The relationships between the BC control signal codes, the boundary B locations and the decoder 112 output lines are described in the first two columns on the left in the chart of FIG. 16.

The boundary A decoder 110 actually has sixteen output lines, there being two output lines for each of the eight different boundary A locations. One line in each pair provides a "true" signal and the other provides a "complement" signal. Thus, for A location 0, for example, there is actually a +AB0 line and a −AB0 line, the plus (+) symbol denoting the true line and the minus (−) symbol denoting the complement line. When the true line is at the binary one level, the complement line is at the binary zero level vice versa. For simplicity of illustration, only the eight true lines are shown in FIG. 17.

These same considerations apply to the boundary B decoder 112. In other words, such decoder 112 has a true output line and a complement output line for each of the eight different boundary B locations.

Figure 18:
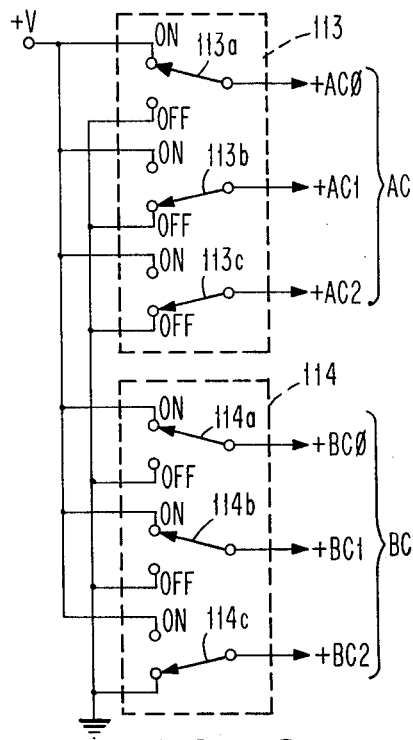
FIG. 18 represents in a symbolic manner how the boundary control signals are obtained for the variable boundary adder of FIG. 17.
Figure 27:
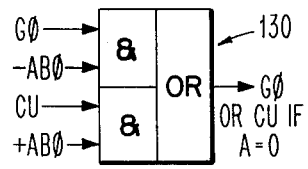
FIGS. 27–34 are logic circuit diagrams showing in greater detail representative forms of construction for the carry generate modifying circuits (switching circuits 13–137) of FIG. 17.
Figure 28:
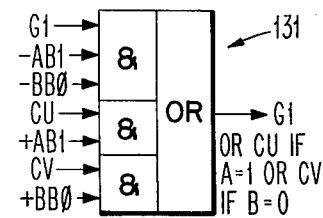

FIG. 18 represents in a symbolic manner a portion of a control unit for generating the coded boundary control signals AC and BC. A first control unit portion 113 having three independently settable binary stages represented by switches 113a, 113b and 113c produces the individual bit signals AC0, AC1 and AC2 which make up the boundary A control signal AC. A second control unit portion 114 having three independently settable binary stages represented by switches 114a, 114b and 114c produces the individual bit signals BC0, BC1 and BC2 which make up the boundary B control signal BC. In a present data processor, the circuits represented by switches 113a–113c and 114a–114c would take the form of high speed binary circuits which can individually provide either a binary one level or a binary zero level output depending upon the particular boundary locations to be selected at a given moment. In a computer or data processor of the microprogrammed type, for example, switches 113a–113c and 114a–114c would correspond to individual register stages in the control register which receive the microinstructions or control words from the control storage portion or control store in such computer or data processor.

Returning to FIG. 17, the circuitry for selecting a group of contiguous byte stages and operating such group as an independent adder zone includes carry disabling circuitry coupled in circuit with the carry circuitry represented by the carry logic and group logic units and capable of disabling the carrying circuitry at different predetermined interstage boundaries across the width of the adder. This carry disabling circuitry includes carry transmit disabling circuitry coupled in circuit with the carry transmit circuitry and capable of selectively disabling the carry transmit signals for predetermined ones of the adder stages. This transmit signal disabling circuitry includes gating circuits or switching circuits 120–127 for selectively disabling the transmit signal lines T0–T7 emerging from the one byte adders 30–37, respectively. When in its disabled condition, each of the switch circuits 120–127 maintains a binary zero level on its output line.

Representative forms of construction for the transmit disabling switch circuits 120–127 are shown in FIGS. 19–26, respectively. As there indicated, each of these switch circuits may take the form of an AND gate. The status of each switch circuit is controlled by connecting to a second input thereof one of the complement (−) boundary control lines AB0–AB7 from the boundary A decoder 110 and by connecting to a third input of the switch circuit one of the complement (−) boundary control lines BB0–BB7 from the boundary B decoder 112. An exception is the switching circuit 120 for the byte 0 adder which, as shown in FIG. 19, receives only the −AB0 complement line from the decoder 110.

The particular decoder output lines connected to any given one of the switching circuits 120–127 are chosen so that such circuit will be disabled whenever either one of the A and B boundaries is located immediately to the higher order side (left side in FIG. 17) of the byte adder to which the switch conduit is connected. Take, for example, the switch circuit 122 connected to the byte 2 adder and shown in FIG. 21. When boundary A is immediately to the left of the byte 2 adder, boundary A is at A location 2. When this occurs, the −AB2 complement line from decoder 110 goes to zero and the switch circuit 122 is disabled. In a similar manner, if boundary B is placed immediately to the left of the byte 2 adder, then it is at boundary B location No. 1. In this case, the −BB1 complement signal from the B decoder 112 goes to zero and the switch circuit 122 is disabled. For any other locations of the A and B boundaries (A ≠ 2 and B ≠ 1), the −AB2 and −BB1 complement signals are at the binary one level and the switch circuit 122 is enabled so as to pass the T2 carry transmit signal, if it is present. More accurately, when the switch circuit 122 is enabled, its T2 output reproduces the same signal level as appears at its T2 input. When circuit 122 is disabled, its T2 output remains at the zero level regardless of the condition of the T2 input.

The remainder of the carry transmit disabling switch circuits 120–127 operate in a similar manner with respect to their relative boundary locations.

The carry disabling circuitry of the FIG. 17 embodiment also includes carry generate modifying circuitry coupled in circuit with the carry generate circuitry and capable of selectively substituting external carry-in signals for the carry generate signals normally produced by the adder stages 30–37. In the FIG. 17 embodiment, this carry generate modifying circuitry includes switching circuits 130–137 which are respectively coupled in circuit with the G0–G7 generate signal output lines of the one byte adders 30–37. Representative forms of construction for each of these switching circuits 130–137 is shown in greater detail in respective ones of FIGS. 27–34.

The FIG. 17 adder includes three external carry-in lines 140, 141 and 142 for respectively receiving the CU, CV and CW external carry-in signals for zones 1, 2 and 3. As indicated in FIG. 1, the CU carry-in is associated with and moves with boundary A, while the CV carry-in is associated with and moves with boundary B. The CW carry-in for zone 3 of course remains fixed at the right-hand extremity of the adder. To accomplish the desired objectives, the CU carry-in must be substituted for the carry generate signal produced by the byte adder located immediately on the lower order or right side of boundary A and CV carry-in must be substituted for the carry generate signal produced by the byte adder located immediately to the lower order or right side of boundary B. For these reasons and as shown in FIG. 17, the CU and CV external carry-in lines 140 and 141 run to each of the generate signal switching circuits 130–137, with the exception that only the CU line 140 runs to the highest order switch circuit 130.

As indicated in FIGS. 27–34, each of the generate signal switching circuits 130–137 is also connected to one of the output lines (and its complement line) from the boundary A decoder 110 and to one of the output lines (and its complement line) from the boundary B decoder 112. An exception is the highest order switch circuit 130 which is connected to only the +AB0 (true) and the −AB0 (complement) lines of the A decoder 110. These true and complement control lines from the decoder 110 and 112 control the switching actions in the switch circuits 130–137.

Figure 29:
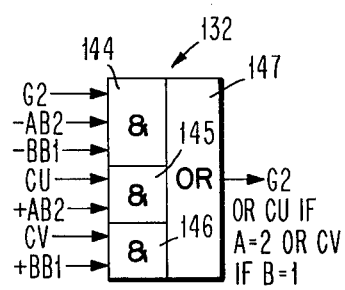
Figure 30:
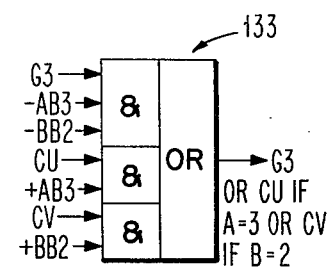
Figure 31:
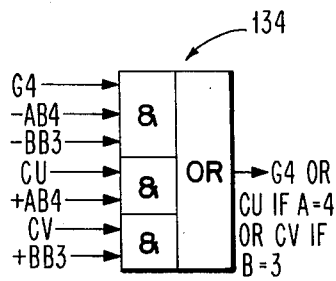
Figure 32:
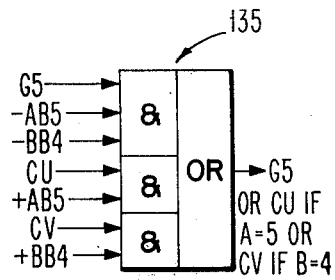
Figure 33:
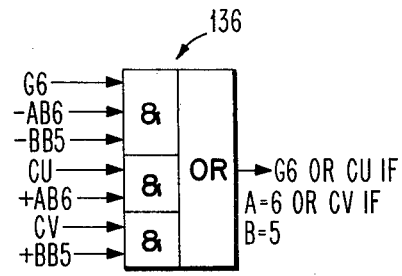
Figure 34:
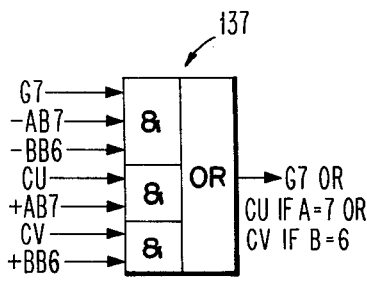

Consider in detail, for example, the switch circuit 132 connected to the output of the byte 2 adder 32. This switching circuit, as seen in FIG. 29, is comprised of three AND circuits 144, 145 and 146, the outputs of which feed into three inputs of an OR circuit 147. Using the letters A and B to denote boundaries A and B, then if A≠2 and B≠1, then the −AB2 and −BB1 signals are at the one level and the +AB2 and +BB1 signals are at the zero level. This condition enables AND circuit 144 and disables AND circuits 145 and 146. This in effect connects the G2 input of AND circuit 144 to the output of OR circuit 147 so that the signal at such output corresponds to the signal appearing at the G2 output of the byte 2 adder. This represents the case where neither boundary A nor boundary B is located immediately to the left of the byte 2 adder.

For the case where boundary A is located immediately to the left of the byte 2 adder, A = 2 and B≠1. In this case, the −AB2 control line is at the zero level and the +AB2 line is at the one level. This disables the AND circuit 144 and enables the AND circuit 145. AND circuit 146 remains disabled because the +BB1 signal remains at the zero level. For this set of conditions, the CU external carry-in line is effectively connected to the output line of the OR circuit 147. This substitutes the CU external carry-in signal for the G2 generate signal.

If boundary B is placed at B location 1, then B = 1 and A ≠ 2. In this case, the −BB1 control line goes to zero and the +BB1 control line goes to the one level. This disables the AND circuit 144 and enables the AND circuit 146. The AND circuit 145 remains disabled because the +AB2 control line remains at the zero level. These conditions of the AND circuits serve to, in effect, connect the CV carry-in line to the output of the OR circuit 147. This serves to substitute the CV external carry-in signal for the G2 generate signal.

A similar type of reasoning applies for the remainder of the generate signal switching circuits 130–137. The CU carry-in signal is substituted for the generate signal if boundary A is located immediately to the left of the switching circuit and the CV carry-in signal is substituted for the generate signal if boundary B is located immediately to the left of the switching circuit. Otherwise, the normal byte adder generate signal appears at the output of the switching circuit.

Figure 35:
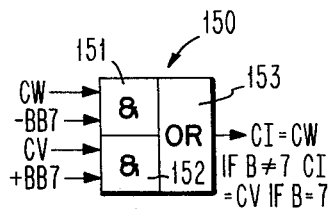
FIG. 35 is a logic circuit diagram showing a representative form of construction for the carry-in logic unit 150 of FIG. 17.

As indicated in FIG. 17, a carry-in logic unit 150 is used to provide the proper carry-in signal CI to the lowest order byte 7 adder and to the right-hand end of the carry look-ahead circuitry. The carry-in logic 150 chooses between the CV and CW external carry-in signals, depending on the location of boundary B. Carry-in logic 150 executes the relationship for CI given in the chart of FIG. 14. A representative form of implementation for this logic 150 is shown in FIG. 35. If boundary B is not at B location 7, then the −BB7 boundary control line is at the binary one level and the +BB7 line is at the binary zero level. This activates an AND circuit 151 to connect to CW line to the output of an OR circuit 153. Conversely, if boundary B is at B location 7, then a second AND circuit 152 is enabled and the first AND circuit 151 is disabled. This connects the CV carry-in line to the output line of the OR circuit 153. Thus, for all boundary B locations other than location 7, CI equals CW. Only when boundary B is at location 7 does CI equal CV.

Figure 36:
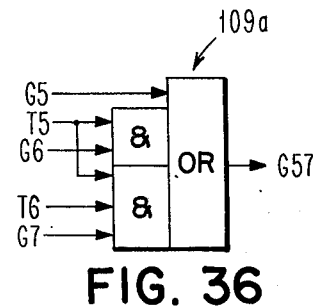
FIGS. 36 and 37 are logic circuit diagrams showing in greater detail representative forms of construction for the circuits included within the group logic unit 109 of FIG. 17 and which produce the group generate and the group transmit signals for such unit.
Figure 37:
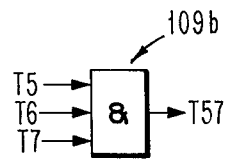
Figure 38:
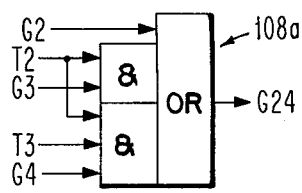
FIGS. 38 and 39 are logic circuit diagrams showing representative forms of construction for the circuits within the group logic unit 108 of FIG. 17 and which produce the group generate and group transmit signals for such unit.
Figure 39:
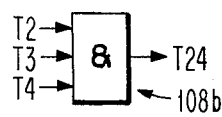
Figure 41:
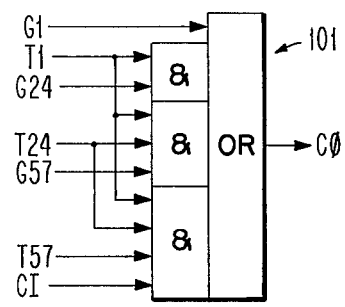
FIGS. 40–47 are logic circuit diagrams showing representative forms of construction for the carry logic units 100–105, 46 and 47 of FIG. 17.
Figure 42:
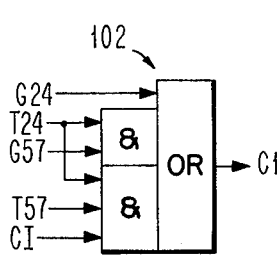
Figure 40:
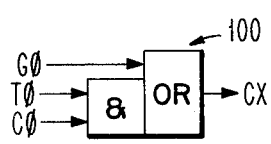
Figure 43:
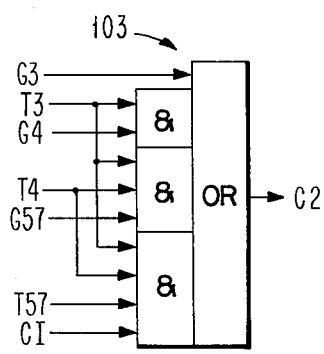
Figure 44:
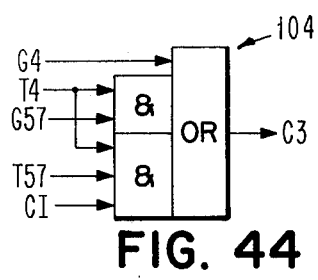
Figure 46:
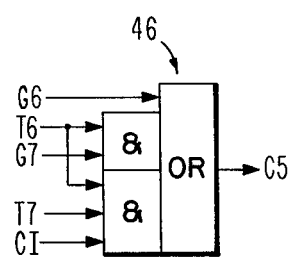
Figure 45:
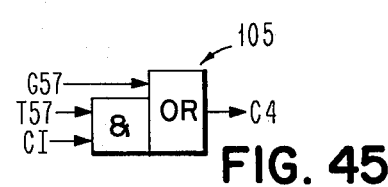
Figure 47:
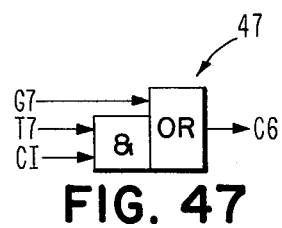

Representative forms of circuitry which may be used in the group logic units 108 and 109 is shown in FIGS. 36–39. These circuits respectively execute the logical relationships for G57, T57, G24 and T24 set forth in the chart of FIG. 14. The circuitry of FIGS. 36 and 37 is located in the group logic unit 109, while the circuitry of FIGS. 38 and 39 is located in the group logic unit 108.

Representative forms of implementation for the carry logic units 100–105, 46 and 47 are respectively shown in FIGS. 40–47. These logic circuits execute the corresponding logical relationships set forth in the chart on FIG. 14.

In the FIG. 17 embodiment, the circuitry for operating each of the different zones as an independent parallel adder further includes circuitry for providing external carry-out connections to the highest order stage in each zone. As indicated in FIG. 1, the external carry-out for zone 1 is CX, the external carry-out for zone 2 is CY and the external carry-out for zone 3 is CZ. The zone 1 carry-out CX, of course, remains fixed at the left-hand extremity of the adder. CY, on the other hand, is associated with boundary A and must be able to move in step therewith. Similarly, CZ is associated with boundary B and must be able to move in step with such boundary B.

With reference to FIG. 17, the external carry-out connection for CX includes a carry-out line 160 which is connected to the carry logic unit 100. The external carry-out connection for CY includes a carry-out line 161 which is connected to the output of a CY carry-out selector 162. The carry-out connection for CZ includes a carry-out line 163 which is connected to the output of a CZ carry-out selector 164. Representative forms of construction for the CY selector 162 and the CZ selector 164 are shown in FIGS. 48 and 49, respectively.

Figure 48:
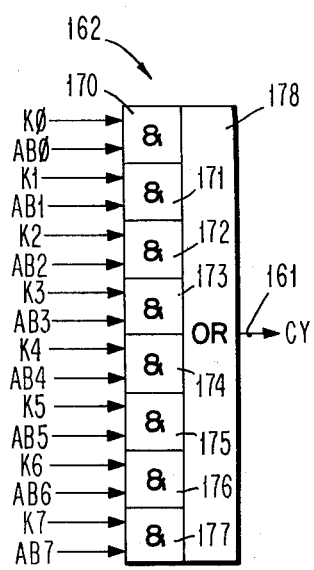
FIG. 48 shows a representative form of construction for the CY carry-out selector 162 of FIG. 17.
Figure 49:
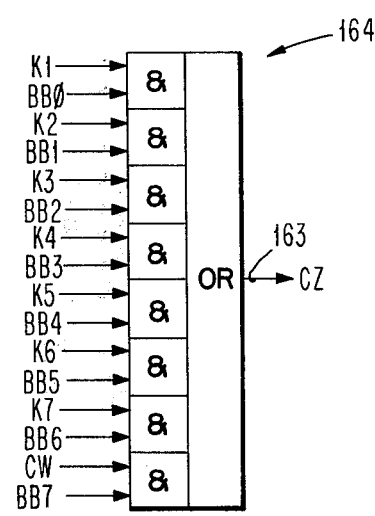
FIG. 49 shows a representative form of construction for the CZ carry-out selector 164 of FIG. 17.

As indicated in FIG. 48, the CY carry-out selector 162 includes a set of eight two-input AND gates 170–177, each having its output connected to the input of an OR circuit 178. On input of each of the AND gates 170–177 is connected to one of the byte carry-out lines K0–K7 of the byte adders 30–37, AND gate 170 being connected to the K0 line, AND gate 171 being connected to the K1 line, AND gate 172 being connected to the K2 line, etc. Each of the byte adders 30–37 includes a byte carry-out logic unit corresponding to the byte carry-out logic unit 98 shown in FIG. 11. These units produce the K0–K7 byte carry-out signals.

The second input of each of the AND gates 170–177 is connected to a different one of the AB0–AB7 boundary control lines of the boundary A decoder 110. These boundary control lines AB0–AB7 determine which one of the eight AND gates 170–177 will be enabled at any given moment, the remainder of the AND gates being disabled at such moment. In other words, only one of the AB0–AB7 boundary control lines will be at the binary one level at any given moment, the particular line at the one level corresponding to the location of boundary A at that moment. Thus, for example, if boundary A is at A location 2, then AB2 is at the one level and AND gate 172 is enabled. This in effect connects the K2 carry-out line for the byte 2 adder to the CY carry-out line 161. This is the desired result because the byte 2 adder is the one that is located immediately to the lower order side of the boundary when boundary A is at location 2.

The CZ carry-out selector 164 is of the same construction as the CY carry-out selector 162. Its set of eight AND gates are individually connected to different ones of the K1–K7 byte carry-out lines and the CW external carry-in line. These AND gates are also connected to and controlled by the boundary control lines BB0–BB7 of the boundary B decoder 112. The CZ selector 164 functions in the same manner for boundary B as did the CY selector 162 for boundary A.

The FIG. 17 adder also includes error circuitry for generating a boundary error signal E in the event that the A and B boundaries are located so as to cause an undesired overlapping of zones 1 and 3. This error circuitry includes an error unit 180 which produces a boundary error signal (E = 1) if A > B, where A and B denote the numerical values of the boundary locations on the A and B boundary scales. Since the B scale is offset one byte to the right with respect to the A scale, this means that the boundary error signal E will be at the error indicating one level if boundary B is to the left of boundary A or if boundary B coincides with boundary A. When error signal E is at the binary zero level, this indicates that boundary B is at least one byte to the right of boundary A.

Figure 50:
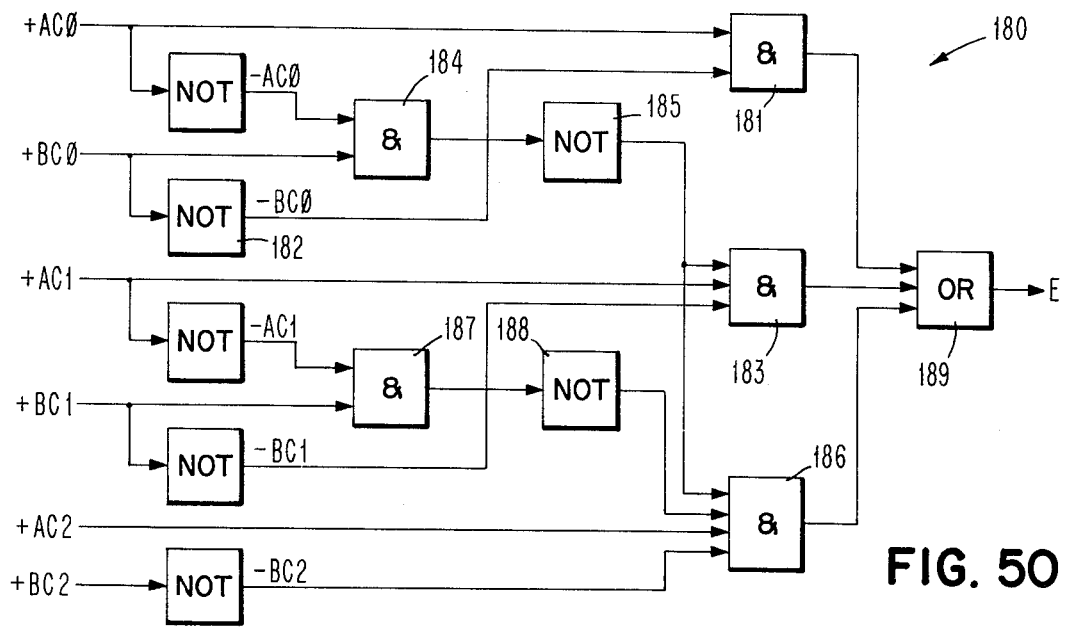
FIG. 50 shows a representative form of construction for the A > B error unit 180 of FIG. 17.

A representative form of construction for the boundary error circuitry 180 is shown in FIG. 50. This circuitry operates to compare the coded three-bit boundary A control signal AC with the coded three-bit boundary B control signal BC to produce the boundary error signal (E = 1) when A > B. More particularly, a first AND circuit 181 looks at the most significant AC bit (AC0) and the most significant BC bit (BC0) and produces an error indicating one level output if AC0 > BC0. This occurs when +AC0 = 1 and +BC0 = 0. In this case, the −BC0 complement signal provided by a NOT circuit 182 is at the binary one level to produce the appropriate one level output at the output of AND circuit 181.

A second AND circuit 183 operates to compare the next two bits, namely, AC1 and BC1, in the coded control signals to produce an error indicating one level output if AC1 is greater than BC1, provided that AC0 is equal to or greater than BC0. This proviso function is executed by an AND circuit 184 and a NOT circuit 185. Such circuits 184 and 185 serve to disable the AND circuit 183 when AC0 < BC0. In such case, there can be no error and the comparison of the second two digits should in fact be disabled.

A further AND circuit 186 operates to compare the least significant bits AC2 and BC2 and to produce an error indicating one level output if AC2 > BC2, provided that AC0 is equal to or greater than BC0 and further provided that AC1 is equal to or greater than BC1. The first proviso is executed by circuits 184 and 185, as previously described. The second and further proviso is executed by an AND circuit 187 and a NOT circuit 188. These circuits 187 and 188 serve to disable the AND circuit 186 if AC1 < BC1. This is the proper thing to do because the least significant bits should not be considered if the two next higher order bits have an error-free relationship. The outputs of the AND circuits 181, 183 and 186 are connected to a common output line by means of an OR circuit 189.

Figure 51:
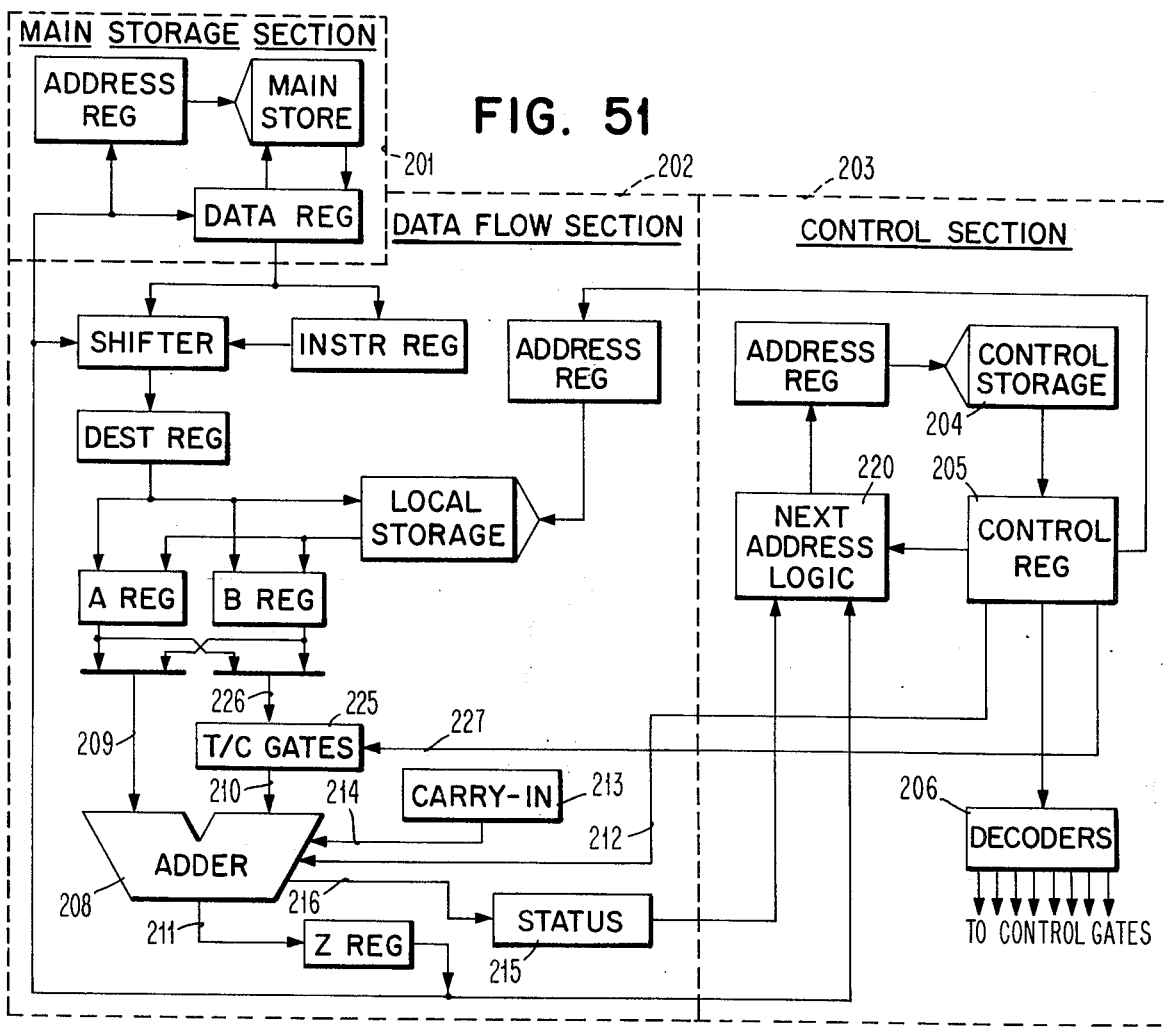
FIG. 51 is a functional block diagram of the main storage, data flow and control sections of a representative borrow-in signals, CX, CY and CZ are thought of as being borrow-out signals general purpose digital computer and showing the use of the FIG. 17 variable boundary adder therein.

Referring now to FIG. 51, there is shown a functional block diagram showing the data flow for a representative microprogrammed general purpose digital computer or data processor. This computer or data processor includes a main storage section 201, a data flow section 202 and a control section 203. In general, each of the lines running between the solid line blocks represents a multi-conductor data bus. As is customary in the computer art, the control gates which control the flow of data signals along these data buses are not shown. The abreviation "REG" stands for "register". The abbreviation "T/C" stands for "true/complement."

The control section 203 controls the operation of the data flow section 202 snd the main storage section 201. To this end, a control storage unit 204 located in the control section 203 is loaded with microinstructions or control words which control the main storage and data flow sections to enable them to perform the various actions that may be required of them. These control words are read out and placed in a control register 205 one at a time, a new control word replacing the previous control word at the beginning of each machine cycle. Appropriate fields in the control word in control register 205 are supped to decoders 206 which, in turn, produce the control signals which control the various control gates associated with the various data buses in the data flow and main storage sections 202 and 201. The control word in control register 205 also supplies other types of control signals to some of the units in the data flow section 202. Examples of such other signals will be considered hereinafter.

Located in the data flow section 202 is a multidigit parallel adder 208 constructed in accordance with the present invention. In particular, the adder 208 is assumed to be the multibyte adder shown in FIG. 17. A data bus 209 includes the 64 conductors which supply the 64 A0–A7 data bits to the A side input of the adder 208. Another data bus 210 includes the 64 conductors which supply the 64 B0–B7 data bits to the B side input of the adder 208. An output data bus 211 includes the 64 conductors which receive the 64 S0–S7 data bits which represent the output of the adder 208. A six conductor control bus 212 supplies the three-bit boundary A control signals and the three-bit boundary B control signals developed by the control register 205 to the boundary control inputs AC and BC of the adder 208.

Carry-in circuits 213 are connected by way of conductors 214 to the CU, CV and CW external carry-in lines located in the adder 208. Control gates (not shown) associated with the conductors 214 are controlled by the control register 205 to enable CU, CV and CW carry-in signals to be applied to the adder 208 at the appropriate times.

Status latches 215 are provided for receiving the CX, CY and CZ zone carry-out signals and the E boundary error signal which may be produced within the adder 208. These status latches are individually connected to different ones of the CX, CY, CZ and E output lines by means of conductors 216. These status latches 215 are also connected to the next address logic 220 located in the control section 203 for enabling the microprogram in control storage 204 to branch to the appropriate control word which may be required by the existence of a particular status condition in the adder 208.

The B0–B7 data bits are supplied to the B side input of the adder 208 by way of T/C (true/complement) gates 225. These T/C gates 225 receive data bits by way of a data bus 226 and, in turn, supply either a true representation or a complement representation of these data bits to the B side input of the adder 208. If an addition is to be performed, the true representations are supplied to the B side input. If a subtraction is to be performed, the complement representations are supplied to the B side input. The choice as to what is supplied to the B side input is made by the control register 205, which controls the T/C gates 225 by way of control bus 227. Preferably, independent control is provided for each of the eight different one byte zones in the T/C gate unit 225. Such independent control enables the adder 208 to simultaneously perform an addition in one zone and a subtraction in another zone.

For a typical ALU operation involving data fields of less than the full width of the adder 208 and which are not right justified, the control register 205 sets the locations of boundary A and boundary B to coincide with the extremities of the data fields in question. Such data fields may then be processed directly by the adder 208 without need of any shifting to right justify same. This saves time and increases the data processing speed.

As previously mentioned, the A and B boundaries can also be set to provide two or three independent operating zones in the adder 208. This enables two or three independent sets of addition or subtraction or both to be simultaneously performed by the adder 208. This also saves time and increases the data processing speed.

As mentioned above, the present invention is also applicable to multidigit parallel binary subtractors. As is known, the essential difference between binary adders and binary subtractors is that adders use carry-in and carry-out signals while subtractors use borrow-in and borrow-out signals. For ripple type devices, adders propagate carry-out signals from the lower to higher order stages, while subtractors propagate borrow-out signals from the lower to higher order stages. For look-ahead type devices, adder look-ahead circuits generate carry-in signals for subsequent stages, while subtractor look-ahead circuits generate borrow-in signals. Thus, a look-ahead type subtractor is called a borrow look-ahead subtractor.

The difference between a parallel binary adder and a parallel binary subtractor occurs at the bit level. Considering, therefore, a single bit position, the logic for generating the resultant difference bit in the case of a subtractor is exactly the same as the logic for generating the resultant sum bit in the case of an adder. The logic for the carries and borrows is, however, slightly different. For the case of an adder bit position:

$$C_{out} = X \cdot Y + (X+Y) \cdot C_{in} \qquad (21)$$

where $C_{out}$ is the carry-out, $C_{in}$ is the carry-in and X and Y are the two input bits being added. For the case of a subtractor bit position:

$$B_{out} = \overline{X} \cdot Y + (\overline{X \forall Y}) \cdot B_{in} \qquad (22)$$

where $B_{out}$ is the borrow-out, $B_{in}$ is the borrow-in and X and Y are the two input bits being subtracted.

For the case of look-ahead adders, the X·Y term is used as the generate function while, for look-ahead subtractors, the $\overline{X} \cdot Y$ term is used as the generate function. For look-ahead adders, the X+Y term (or its logical OR equivalent) is used as the transmit function while, for look-ahead subtractors, the $\overline{X \forall Y}$ term (or its logical EXCLUSIVE-OR NOT equivalent) is used as the transmit function. Apart from these bit level considerations, the remainder of the circuitry for both the look-ahead adder and the look-ahead subtractor can be substantially the same.

With the foregoing in mind, the arithmetic device 10 of FIG. 1 can be considered as representing a multidigit parallel binary subtractor instead of an adder, provided that CU, CV and CW are thought of as being zone borrow-in signals, CX, CY and CZ are thought of as being zone borrow-out signals and S0–S7 are thought of as being the resultant difference signals. The movable boundary mechanisms are implemented in the same manner as described above, bearing in mind that the carry-in and carry-out signals must be thought of as being borrow-in and borrow-out signals.

It is noted in passing that the embodiments of the invention described hereinabove were explained primarily in terms of circuit combinations employing positive logic. This was deliberately done to simplify an understanding of the basic concepts. It should be understood, however, that such embodiments can also be explained in terms of circuit combinations employing negative logic or a mixture of positive and negative logic. It is further noted that the representative forms of construction for the logic circuitry, switching circuitry and the like described hereinabove were implemented by means of AND, OR and NOT circuits. This was also done to simplify the understanding process. It should be understood, however, that such circuitry can also be implemented, in whole or in part, by means of NAND circuits or NOR circuits or other forms of logic circuits.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A digital adder comprising:
  multidigit parallel adder circuitry having a number of digit stages;
  circuitry for selecting two nonoverlapping groups of contiguous digit stages in the adder circuitry and for operating each group as a parallel adder independently of the other group;
  and circuitry for varying the sizes of the two groups.

2. A plural zone digital adder comprising:
  multidigit parallel adder circuitry having a number of digit stages;
  circuitry for subdividing the adder circuitry into two groups of contiguous digit stages and for operating each group as a parallel adder independently of the other group;
  and circuitry for varying the location of the boundary between the two groups.

3. A plural zone digital adder comprising:
  multidigit parallel adder circuitry having a number of digit stages;
  circuitry for subdividing the adder circuitry into two groups of contiguous digit stages and for simultaneously operating each group as a parallel adder independently of the other group;
  and circuitry for varying the location of the boundary between the two groups.

4. A plural zone digital adder comprising:
  multidigit carry look-ahead parallel adder circuitry having a number of digit stages and carry look-ahead circuitry associated therewith for generating carry-in signals for each digit stage;
  circuitry for subdividing the adder circuitry into two groups of contiguous digit stages and for operating each group and its part of the carry look-ahead circuitry as a carry look-ahead parallel adder independently of the other group;
  and circuitry for varying the location of the boundary between the two groups.

5. A plural zone digital adder comprising:
  multibyte parallel adder circuitry having a number of byte size groups of contiguous digit stages;
  circuitry for subdividing the adder circuitry into two sets of contiguous byte size groups and for operating each set as a parallel adder independently of the other set;
  and circuitry for varying the location of the boundary between the two sets.

6. A plural zone digital adder comprising:
  multidigit parallel adder circuitry having a number of digit stages;
  circuitry for subdividing the adder circuitry into three groups of contiguous digit stages and for operating each group as a parallel adder independently of the other groups;
  and circuitry for varying the locations of the boundaries between the groups.

7. A plural zone digital adder comprising:
  multidigit parallel adder circuitry having a number of digit stages;
  circuitry for subdividing the adder circuitry into consecutive first, second and third groups of contiguous digit stages and for operating each group as a parallel adder independently of the other groups;
  first boundary selection circuitry for varying the location of the boundary between the first and second groups;
  and second boundary selection circuitry for varying the location of the boundary between the second and third groups.

8. A plural zone digital adder in accordance with claim 7 and further including error circuitry for generating a boundary error signal in the event that the boundaries are located so as to cause an overlapping of the first and third groups.

9. A digital adder comprising:

multidigit parallel adder circuitry having a number of digit stages and carry circuitry associated therewith for generating carry-in signals for each digit stage;

carry disabling circuitry coupled in circuit with the carry circuitry and capable of disabling the carry circuitry at different predetermined interstage boundaries across the width of the adder circuitry;

boundary selection circuitry for controlling the carry disabling circuitry for selecting a particular boundary at which the carry circuitry is to be disabled, such boundary selection circuitry being capable of selecting any desired one of the different predetermined interstage boundaries;

and circuitry for operating the digit stages on one side of the selected boundary as a parallel adder independently of the digit stages on the other side of the boundary.

10. A digital adder in accordance with claim 9 wherein the carry circuitry is of the carry look-ahead type.

11. A digital adder in accordance with claim 9 and including circuitry for providing external carry-in connections to the lowest order stage in each of the two groups of digit stages and circuitry for providing external carry-out connections to the highest order stage in each of the two groups of digit stages, wherein one group includes the digit stages on one side of the selected boundary and the other group includes the digit stages on the other side of the selected boundary.

12. A digital adder comprising:
multibyte parallel adder circuitry having a number of byte size groups of contiguous digit stages and carry circuitry associated therewith for generating carry-in signals for each byte size group;

carry disabling circuitry coupled in circuit with the carry circuitry and capable of disabling the carry circuitry at each of the different intergroup boundaries across the width of the adder circuitry;

boundary selection circuitry for controlling the carry disabling circuitry for selecting a particular boundary at which the carry circuitry is to be disabled, such boundary selection circuitry being capable of selecting any desired one of the different intergroup boundaries;

and circuitry for operating the digit stages on one side of the selected boundary as a parallel adder independently of the digit stages on the other side of the boundary.

13. A digital adder comprising:
multidigit parallel adder circuitry having a number of digit stages and carry circuitry associated therewith for generating carry-in signals for each digit stage;

carry disabling circuitry coupled in circuit with the carry circuitry and capable of disabling the carry circuitry at different predetermined interstage boundaries across the width of the adder circuitry;

boundary selection circuitry for controlling the carry disabling circuitry for selecting a particular boundary at which the carry circuitry is to be disabled, such boundary selection circuitry being capable of selecting any desired one of the different predetermined interstage boundaries;

and circuitry responsive to the boundary selection circuitry for providing an external carry-in connection to the digit stage located immediately to the higher order side of the selected boundary.

14. A digital adder in accordance with claim 13 and further including circuitry responsive to the boundary selection circuitry for providing an external carry-out connection to the digit stage located immediately to the lower order side of the selected boundary.

15. A digital adder comprising:
multidigit parallel adder circuitry having a number of digit stages and carry circuitry associated therewith for generating carry-in signals for each digit stage;

carry disabling circuitry coupled in circuit with the carry circuitry and capable of disabling the carry circuitry at different predetermined interstage boundaries across the width of the adder circuitry;

first boundary selection circuitry for controlling the carry disabling circuitry for selecting a first boundary at which the carry circuitry is to be disabled;

second boundary selection circuitry for controlling the carry disabling circuitry for selecting a second boundary at which the carry circuitry is to be disabled;

and circuitry for operating each of the three groups of digit stages defined by the two selected boundaries as a parallel adder independently of the digit stages in the other groups.

16. A digital adder in accordance with claim 15 wherein the second selected boundary is intended to be located on a given side of the first selected boundary and further including error circuitry for generating a boundary error signal in the event that the second selected boundary is caused to be located on the other side of the first selected boundary.

17. A digital adder comprising:
multidigit parallel adder circuitry having a number of digit stages and carry circuitry associated therewith for generating carry-in signals for each digit stage;

carry disabling circuitry coupled in circuit with the carry circuitry and capable of disabling the carry circuitry at different predetermined interstage boundaries across the width of the adder circuitry;

first boundary selection circuitry for controlling the carry disabling circuitry for selecting a first boundary at which the carry circuitry is to be disabled;

second boundary selection circuitry for controlling the carry disabling circuitry for selecting a second boundary at which the carry circuitry is to be disabled;

and circuitry responsive to the first and second boundary selection circuitry for providing external carry-in connections to the digit stages located immediately to the higher order sides of the two selected boundaries.

18. A digital adder in accordance with claim 17 and further including circuitry responsive to the first and second boundary selection circuitry for providing external carry-out connections to the digit stages located immediately to the lower order sides of the two selected boundaries.

19. A carry look-ahead parallel digital adder comprising:
multidigit parallel adder circuitry having a number of adder stages;

carry generate circuitry for producing a carry generate signal for each adder stage;

carry transmit circuitry for producing a carry transmit signal for each adder stage;

carry look-ahead circuitry responsive to the carry generate and carry transmit signals for producing carry-in signals for the adder stages;

carry transmit disabling circuitry coupled in circuit with the carry transmit circuitry and capable of selectively disabling the carry transmit signals for predetermined ones of the adder stages;

and boundary selection circuitry for controlling the carry transmit disabling circuitry for disabling the carry transmit signal for a particular one of the adder stages.

20. A carry look-ahead parallel digital adder in accordance with claim 19 and further including second boundary selection circuitry for controlling the carry transmit disabling circuitry for disabling the carry transmit signal for a second and different particular one of the adder stages.

21. A carry look-ahead parallel digital adder comprising:
multidigit parallel adder circuitry having a number of adder stages;
carry generate circuitry for producing a carry generate signal for each adder stage;
carry transmit circuitry for producing a carry transmit signal for each adder stage;
carry look-ahead circuitry responsive to the carry generate and carry transmit signals for producing carry-in signals for the adder stages;
carry transmit disabling circuitry coupled in circuit with the carry transmit circuitry and capable of selectively disabling the carry transmit signals for predetermined ones of the adder stages;
external carry-in circuitry for receiving an external carry-in signal;
carry generate modifying circuitry coupled in circuit with the carry generate circuitry and capable of selectively substituting the external carry-in signal for the carry generate signals for the predetermined ones of the adder stages;
and boundary selection circuitry for controlling the carry transmit disabling circuitry and the carry generate modifying circuitry for disabling the carry transmit signal for a particular one of the adder stages and for substituting the external carry-in signal for the carry generate signal for this same particular one of the adder stages.

22. A carry look-ahead parallel digital adder in accordance with claim 21 and further including circuitry responsive to the boundary selection circuitry for providing an external carry-out connection to the adder stage having its carry transmit signal disabled by such boundary selection circuitry.

23. A carry look-ahead parallel digital adder in accordance with claim 21 and further including second external carry-in circuitry for receiving a second external carry-in signal and additionally including second boundary selection circuitry for controlling the carry transmit disabling circuitry and the carry generate modifying circuitry for disabling the carry transmit signal for a second and different particular one of the adder stages and for substituting the second external carry-in signal for the carry generate signal for the same second particular one of the adder stages.

24. A carry look-ahead parallel digital adder in accordance with claim 23 and further including circuitry responsive to the first and second boundary selection circuitry for providing separate external carry-out connections to the adder stages having their carry transmit signals disabled by such first and second boundary selection circuitry.

25. A digital arithmetic device comprising:
a multidigit parallel arithmetic device having a number of digit stages for arithmetically combining two multibit binary bit sequences;
circuitry for selecting plural nonoverlapping groups of contiguous digit stages in the arithmetic device and for operating each group as a parallel arithmetic device independently of the other groups;
and circuitry for varying the sizes of the groups.

26. A plural zone digital arithmetic device comprising:
a multidigit parallel arithmetic device having a number of digit stages for arithmetically combining two multibit binary bit sequences;
circuitry for subdividing the arithmetic device into plural groups of contiguous digit stages and for operating each group as a parallel arithmetic device independently of the other groups;
and circuitry for varying the locations of the boundaries between the groups.

27. A plural zone digital arithmetic device comprising:
a multidigit parallel arithmetic device having a number of digit stages for arithmetically combining two multibit binary bit sequences;
and circuitry for subdividing the arithmetic device into plural groups of contiguous digit stages and for operating each group as a parallel arithmetic device independently of any other group.

* * * * *

UNITED STATES PATENT OFFICE
CERTIFICATE OF CORRECTION

Page 1 of 2

Patent No. 3,987,291     Dated October 19, 1976

Inventor(s) David N. Gooding and Everett M. Shimp

It is certified that error appears in the above-identified patent and that said Letters Patent are hereby corrected as shown below:

Column 2, line 23, after "computer" insert --or--; line 27, delete "to", first occurrence; line 53, after "of" insert --the--; line 68, "multilayer" should read --multibyte--. Column 3, line 19, "13-137)" should read --130-137)--; line 44, after "tive" delete the rest of the line; line 45, delete "as being borrow-out signals", and before "general" insert --microprogrammed--. Column 7, line 38, "carry-In" should read --carry-in--; line 54, delete "signal", first occurrence. Column 10, line 5, "34)." should read --54).--; line 12, "of a bit" should read --of bit--. Column 11, line 4, equation (14)

"$c_n = g(n+1) + t(n+1)c(n+1)$"   should read

--$c_n = g(n+1) + t(n+1) \cdot c(n+1)$-- ;

line 21, "The", first occurrence, should read --This--. Column 12, line 5, "transit" should read --transmit--. Column 13, line 66, "on" should read --of--. Column 14, line 35, "of" should read --or--; line 55, "locations" should read --location--. Column 15, line 46, after "AC1," insert --and--. Column 16, line 27, after "level" insert --and--; line 45, after "present" insert --day--; line 50, "at a given" should read --at any given--; line 62, "carrying" should read --carry--.

UNITED STATES PATENT OFFICE
CERTIFICATE OF CORRECTION

Patent No. 3,987,291           Dated October 19, 1976

Inventor(s) David N. Gooding and Everett M. Shimp

It is certified that error appears in the above-identified patent and that said Letters Patent are hereby corrected as shown below:

Column 17, line 25,

"conduit" should read --circuit--. Column 18, line 4, after "and" insert --the--; line 22, "decoder" should read --decoders--. Column 19, line 15, "to", second occurrence, should read --the--; line 62, "On" should read --One--. Column 23, line 28, "beng" should read --being--.

Signed and Sealed this

Thirteenth Day of September 1977

[SEAL]

Attest:

RUTH C. MASON  
*Attesting Officer*

LUTRELLE F. PARKER  
*Acting Commissioner of Patents and Trademarks*